(12) United States Patent
Yamane

(10) Patent No.: US 7,894,428 B2
(45) Date of Patent: Feb. 22, 2011

(54) PACKET RELAY DEVICE

(75) Inventor: Shinji Yamane, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 11/838,398

(22) Filed: Aug. 14, 2007

(65) Prior Publication Data

US 2008/0002727 A1    Jan. 3, 2008

Related U.S. Application Data

(63) Continuation of application No. PCT/JP2005/003788, filed on Mar. 4, 2005.

(51) Int. Cl.
*H04L 12/46* (2006.01)

(52) U.S. Cl. .................... 370/389; 370/390; 370/392; 370/401; 370/465; 370/474

(58) Field of Classification Search .............. 370/389, 370/390, 392, 400, 401, 465, 474, 475
See application file for complete search history.

(56) References Cited

U.S. PATENT DOCUMENTS

| | | | |
|---|---|---|---|
| 5,526,351 A | | 6/1996 | Mochinaga et al. |
| 6,711,163 B1 | | 3/2004 | Reid et al. |
| 7,020,796 B1 * | | 3/2006 | Ennis et al. ............... 714/4 |
| 7,130,303 B2 * | | 10/2006 | Hadzic .................. 370/389 |
| 7,577,141 B2 * | | 8/2009 | Kamata et al. ............ 370/390 |
| 7,606,228 B2 * | | 10/2009 | Park et al. ............... 370/390 |
| 7,710,961 B2 * | | 5/2010 | Miller et al. ............. 370/390 |
| 7,715,394 B2 | | 5/2010 | Six |
| 2004/0208189 A1 | | 10/2004 | Fukuda |
| 2004/0213270 A1 | | 10/2004 | Su et al. |

(Continued)

FOREIGN PATENT DOCUMENTS

CN    1545265    11/2004

(Continued)

OTHER PUBLICATIONS

K. Egevang, et al. "The IP Network Address Translator (NAT)", Network Working Group: Request for Communicatins: 1631, May 1994, pp. 1-9, Crazy Communications.

(Continued)

*Primary Examiner*—Pankaj Kumar
*Assistant Examiner*—Duc T Duong
(74) *Attorney, Agent, or Firm*—Katten Muchin Rosenman LLP

(57) ABSTRACT

Provided is a packet relay device for efficiently transferring a communication packet transmitted from a plurality of terminals connected with a network. The packet relay device is positioned in the network, in which a plurality of local networks are connected with each other through a global network, and at the boundary between the local network and the global network. The packet relay device comprises an acquisition unit for specifying the terminal of a transmission source from a broadcast packet transmitted by the terminal in the local network thereby to acquire group information on the group, to which the specified terminal belongs, a conversion unit for converting the broadcast packet into a virtual multicast packet corresponding to the group information acquired beforehand, a transfer unit for transferring the virtual multicast packet to another corresponding relay device, and a packet conversion unit for converting the virtual multicast packet into a corresponding real broadcast packet.

14 Claims, 16 Drawing Sheets

U.S. PATENT DOCUMENTS

2004/0264458 A1    12/2004    Six
2005/0089050 A1*    4/2005    Cheriton ..................... 370/397

FOREIGN PATENT DOCUMENTS

| | | |
|---|---|---|
| CN | 1578252 | 2/2005 |
| JP | 04120839 | 4/1992 |
| JP | 200126805 | 1/2001 |
| JP | 200128605 | 1/2001 |
| JP | 2001230774 | 8/2001 |
| JP | 2001268125 | 9/2001 |
| JP | 2004254288 | 9/2004 |
| JP | 2004282199 | 10/2004 |
| JP | 2004328719 | 11/2004 |
| JP | 2005020170 | 1/2005 |

OTHER PUBLICATIONS

P. Srisuresh, et al. Load Sharing Using IP Network Address Translation (LSNAT), Network Working Group: Request for Comments: 2391, pp. 1-16, Lucent Technologies.

Yoshitake Tajima, A Design Distributed VPN Suitable for Accessing Multiple Networks, Mar. 2002, p. 47-52, Technical Report of IEICE, NTT Information Sharing Platform Laboratories, NTT Corporation, Tokyo, Japan.

Taisuke Oka, et al. A Scheme to Provide Multi-VPN Services Using a Virtual Networking Service Platform (VNSP), Mar. 2002, p. 41-46, Technical Report of IEICE, NS2001-262, IN2001-218, NTT Information Sharing Platform Laboratories, NTT Corporation, Tokyo, Japan.

K. Egevang, et al. "The IP Network Address Translator (NAT)", Network Working Group: Request for Comments: 1631, May 1994, pp. 1-9.

P. Srisuresh, et al. "Load Sharing Using IP Network Address Translation (LSNAT)", Network Working Group: Request for Comments: 2391, Aug. 1998, pp. 1-16.

Yoshitake Tajima, "A Design Distributed VPN Suitable for Accessing Multiple Networks", Mar. 2002, p. 47-52, Technical Report of IEICE, NS 2001-263, IN 2001-219.

Taisuke Oka, et al."A Scheme to Provide Multi-VPN Services Using a Virtual Networking Service Platform (VNSP)", Mar. 2002, pp. 41-46, Technical Report of IEICE, NS2001-262, IN2001-218.

Chinese First Office Action, dated Mar. 10, 2010, from the corresponding Chinese Application No. 200580048954.9.

* cited by examiner

FIG. 5

| INPUT PORT | DESTINATION ADDRESS | NETWORK MASK | OUTPUT PORT |
|---|---|---|---|
| LOCAL | 10.10.10.0 | 255.255.255.0 | GW-B |
| LOCAL | 230.0.0.1 | 240.0.0.0 | GW-B |
| LOCAL | 230.0.0.2 | 240.0.0.0 | GW-B |
| LOCAL | 230.0.0.3 | 240.0.0.0 | GW-C |
| LOCAL | 10.47.0.0 | 255.255.255.0 | GW-C |

FIG. 11

| INPUT PORT | DESTINATION ADDRESS | NETWORK MASK | OUTPUT PORT |
|---|---|---|---|
| LOCAL | 10.10.10.0 | 255.255.255.0 | GW-B |
| LOCAL | 230.0.0.1 | 240.0.0.0 | GW-B |
| LOCAL | 230.0.0.2 | 240.0.0.0 | GW-B |
| LOCAL | 230.0.0.3 | 240.0.0.0 | GW-C |
| LOCAL | 10.47.0.0 | 255.255.255.0 | GW-C |
| LOCAL | 230.0.10.1 | 240.0.0.0 | GW-B |
| LOCAL | 230.0.10.2 | 240.0.0.0 | GW-B |

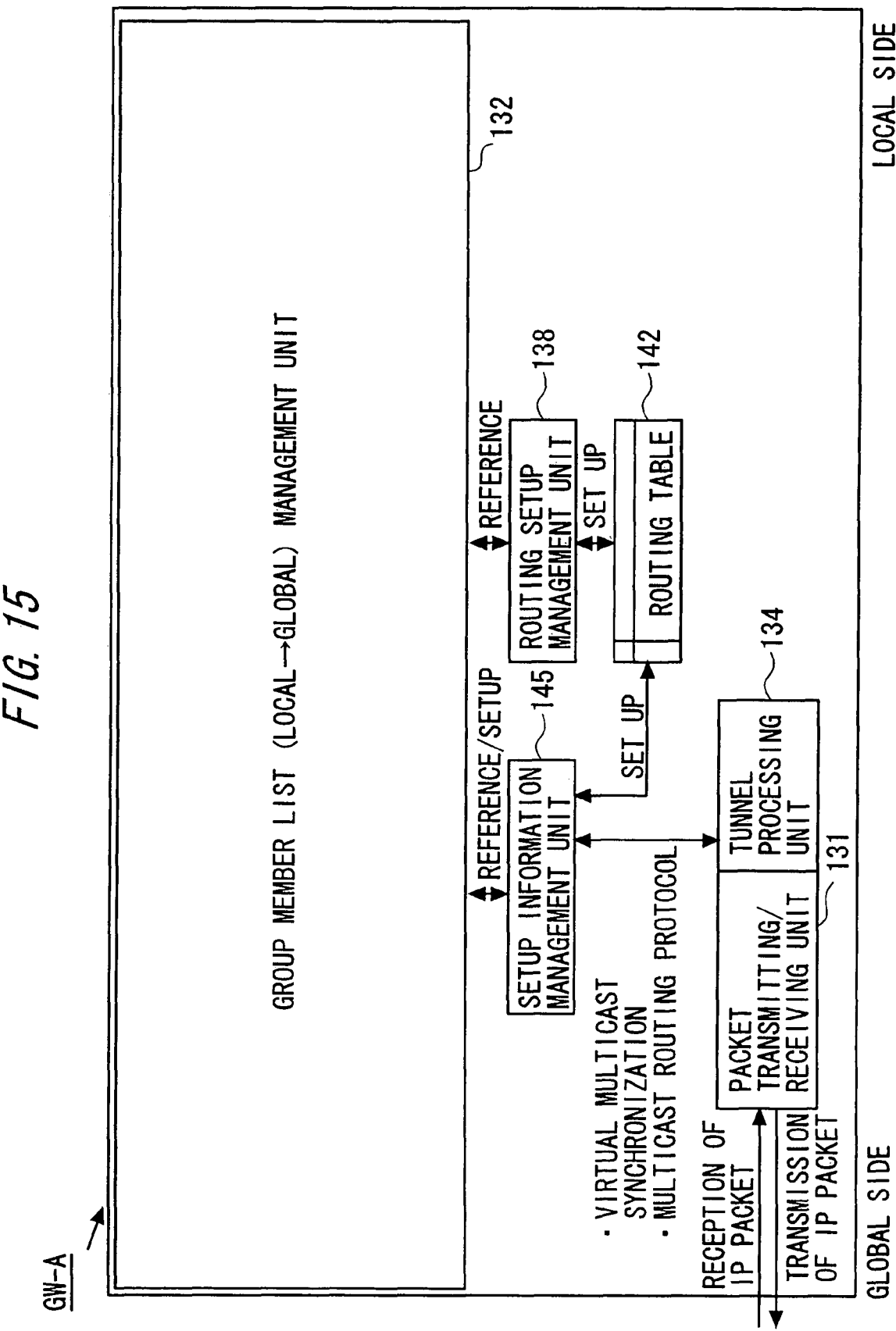

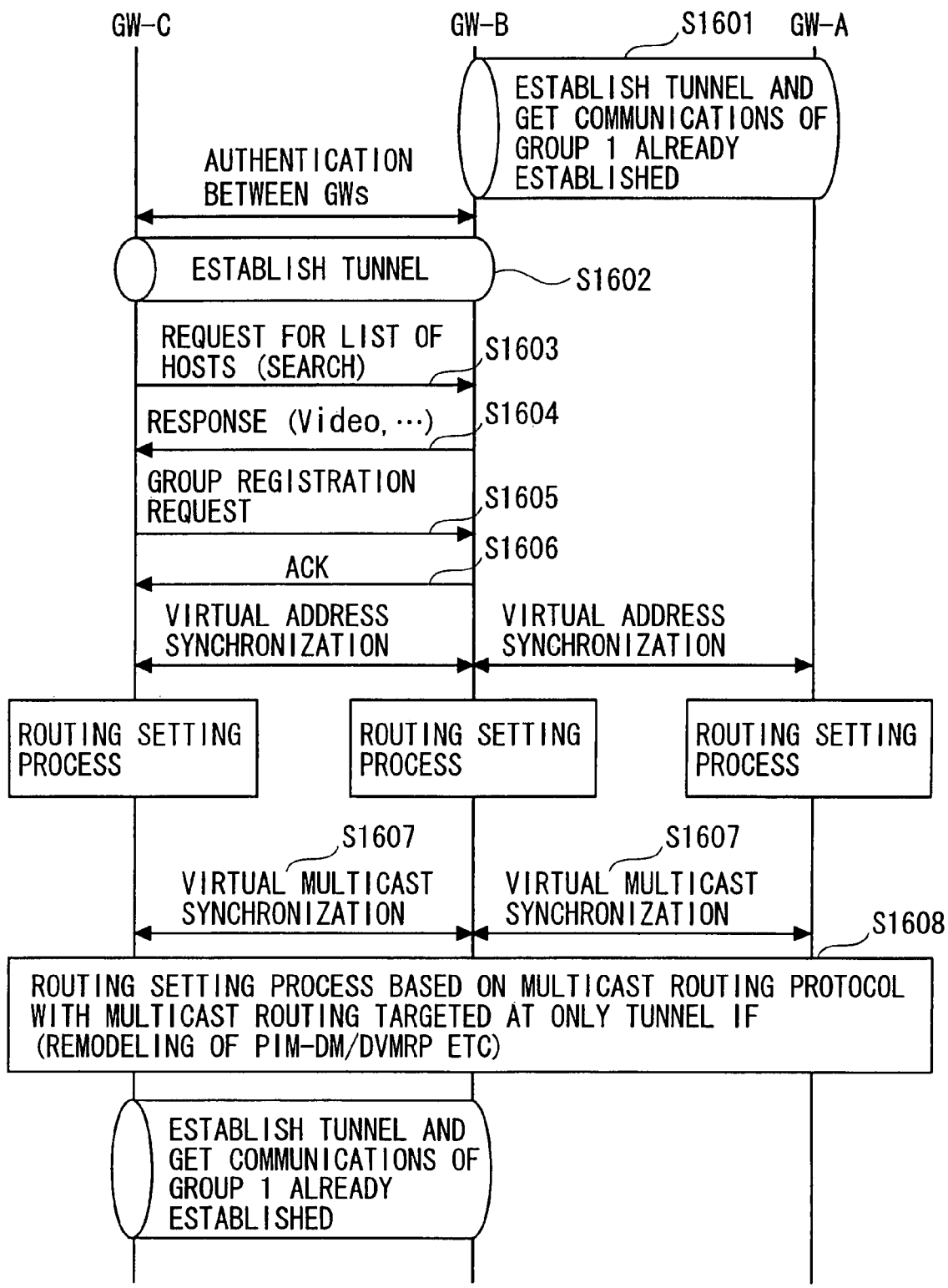

PACKET RELAY DEVICE

CROSS-REFERENCE TO RELATED APPLICATION

This is a continuation of Application PCT/JP2005/003788, filed on Mar. 4, 2005, now pending, the contents of which are herein wholly incorporated by reference.

BACKGROUND OF THE INVENTION

1. Field of the Present Invention

The present invention relates to a packet relay device that provides a closed network on a group-by-group basis by virtually grouping a plurality of terminals connected to a network.

2. Description of the Related Art

IP (Internet Protocol) networks have spread over the recent years, and a variety of apparatuses are connected to the network. Along with this circumstance, such a configuration is considered that, e.g., electrical appliances each having a communication function are connected to the network and controlled from a personal computer (which will hereinafter be abbreviated to PC) connected to the same network.

With the spread of this type of network, the number of the apparatuses connected to the network naturally increases, and therefore it is desirable to manage the respective apparatuses in a unified manner. A management method takes, it is considered, such a scheme that, e.g., the individual apparatuses are grouped on an arbitrary unit, and the apparatuses belonging to the group can perform the communications with each other on the group-by-group basis. This scheme enables a search range to be narrowed down by, in the case of searching for a certain terminal, searching the terminal within the predetermined group, and enables a throughput and a period of time needed for the search to be reduced. Further, the security can be ensured by distinguishing between the group belonging terminal and a non-belonging terminal and by restricting an access from outside to the members belonging to the predetermined group.

Thus, in the case of grouping the communication partner terminals dispersing over the network, the terminals individually authenticate the communication partner terminals and ensure the security on a communication route.

On the other hand, as the number of the terminals connected to the network rises, communication services provided from on the network are diversified. For instance, in the case of considering an IP telephony call service, this service includes, in addition to, of course, a one-to-one call service, one-to-many or many-to-many group conference telephony. This type of communication service entails realizing one-to-many or many-to-many communications between the terminals without being limited to only the one-to-one communications. In the one-to-many or many-to-many communications, a communication method such as broadcast communications or multicast communications be, it is required, employed for more efficiently forwarding a communication packet.

Proposed as a method of forwarding a multicast packet and a broadcast packet, as concomitants of performing the multicast/broadcast communications, to other networks are a method (termed a method 1) of converting a multicast packet into a unicast packet and thus forwarding the packet and a method (termed a method 2) of translating an IP address of the broadcast packet into an IP address of the broadcast packet of a destination.

The conventional method utilizing the multicast involves setting a router for routing the multicast packet within a core network in the communications via the Internet and the large-scale core network. This scheme, as well as causing a rise in load on management of the multicast addresses, leads to a heavy load on the routing process in each relay device.

Further, the method 1 needs to manage, because of translating the multicast packet into the unicast packet and forwarding the packet, for realizing the many-to-many communications, all pieces of address information about the destination terminal in the communications, to which the packet should be forwarded, resulting in a loss of merit of the multicast communications. Furthermore, the method 2, by which the predetermined relay device translates an address of the broadcast packet into a broadcast address for another network, therefore remains unchanged with the unicast communications in the multipoint-to-multipoint communications.

Namely, those methods are incapable of improving scalability as the number of the terminals connected to the network rises and actualizing forwarding the multicast packet/broadcast packet on a predetermined management basis (group-by-group basis). It should be noted that technologies disclosed in the following documents are given as the conventional arts related to the invention of the present application. The Patent document 1 is a Japanese Patent Application Laid-Open Publication No. 2001-230774. The Patent document 2 is a Japanese Patent Application Laid-Open Publication No. 2004-282199.

SUMMARY OF THE INVENTION

It is an object of the present invention to provide a packet relay device that efficiently forwards communication packets transmitted from a plurality of terminals connected to a network.

The present invention adopt adopts the following configurations in order to solve the problems. Namely, the present invention is a packet relay device located at a border between a local network and a global network in a network where a plurality of local networks is connected to each other via the global network and comprising a receiving unit receiving a broadcast packet from a terminal within the local network, an acquisition unit specifying a sender terminal from the broadcast packet and acquiring group information about a group to which the specified sender terminal belongs, a converting unit converting the broadcast packet into a virtual multicast packet associated with the previously acquired group information, and a forwarding unit forwarding the virtual multicast packet toward another relay device connected via the global network and associated with the virtual multicast packet.

Further, the packet relay device according to the present invention may further comprise a virtual packet receiving unit receiving the virtual multicast packet, a packet converting unit converting the virtual multicast packet into a real broadcast packet associated with the virtual multicast packet, and a transmitting unit transmitting the converted real broadcast packet to within the local network.

According to the present invention, the broadcast packet from the terminal is, with respect to each group to which the terminal belongs, converted into the virtual multicast packet associated with each group and is thus forwarded. Namely, the packet relay device according to the present invention, when receiving the broadcast packet from the terminal, recognizes all of the groups to which the terminal belongs, and forwards the broadcast packet to the terminal group belonging to all of the groups.

With this scheme, the present invention enables realization of the intra-group broadcast within a closed network where the individual terminals are organized into the groups.

Still further, according to the present invention, each terminal desiring to transmit the broadcast packet can, without being aware of where the terminal group of the terminals as members of the group to which the self-terminal belongs is located on the network, transmit the broadcast packet to the members of all of the groups to which the self-terminal belongs.

Yet further, according to the present invention, the virtual multicast packet converted based on the group information of the group to which the sender terminal belongs, is forwarded to another packet relay device associated with this virtual multicast packet.

On the occasion of forwarding the broadcast packet, the packet relay device is determined as a forwarder corresponding to the forwarding destination group, and hence a forwarding method corresponding to a network architecture of the group can be adopted on a group-by-group basis.

Moreover, according to the present invention, the virtual multicast packet may be assigned a multicast address as a destination address enabling another packet relay device located at the border between another local network to which to connect another terminal belonging to the same group as the group to which the specified terminal belongs and the global network, to recognize that the virtual multicast packet is a packet into which the broadcast packet for the group has been converted.

Furthermore, the present invention is a packet relay device located at a border between a local network and a global network in a network where a plurality of local networks is connected to each other via the global network, comprises a receiving unit receiving a multicast packet from a terminal within the local network, a packet group acquisition unit acquiring group information associated with the multicast packet; an acquisition unit specifying a sender terminal from the multicast packet, and acquiring group information about a group to which the specified sender terminal belongs, a group determining unit determining a destination group from the group information acquired by the packet group acquisition unit and from the group information acquired by the acquisition unit, a converting unit converting the previously received multicast packet into a virtual multicast packet associated with the destination group, and a forwarding unit forwarding the virtual multicast packet toward another relay device associated with the virtual multicast packet via the global network.

Yet further, the packet relay device according to the present invention may further comprise: a virtual packet receiving unit receiving the virtual multicast packet; a packet converting unit converting the virtual multicast packet into a real broadcast packet associated with the virtual multicast packet; and a transmitting unit transmitting the converted real broadcast packet to within the local network.

According to the present invention, the multicast packet from the terminal is, the forwarding destination group being determined from the group information associated with the multicast address of the multicast packet and from the group information of the group to which the forwarder terminal of the multicast packet belongs, converted into the virtual multicast packet associated with the determined group and then forwarded. Namely, the packet relay device according to the present invention, when receiving the multicast packet from the terminal and if the group to which the terminal belongs is coincident with the group associated with the multicast address of the multicast packet, forwards the packet to the forwarding destination packet relay device.

With this scheme, according to the present invention, it is feasible to realize the intra-group multicast in a closed network where the respective terminals are grouped and to eliminate the multicast packet sent from outside of the group.

Still further, the packet relay device according to the present invention may further comprise: an information transmitting unit transmitting, to another packet relay device, information about the terminal within the local network to which the self packet relay device is connected, group information about the group to which the terminal belongs, converting information for converting the broadcast packet transmitted from the terminal into a virtual multicast packet associated with the group, and reverse converting information for converting the virtual multicast packet back into the real broadcast packet; and an information updating unit updating the self-retained group information, the self-retained converting information and the self-retained reverse converting information on the basis of the group information, the converting information and the reverse converting information given from another packet relay device.

Moreover, the packet relay device according to the present invention may further comprise: an information transmitting unit transmitting, to another packet relay device, group information associated with the multicast packet transmitted from the terminal within the local network, second group information about a group to which the terminal belongs, converting information for converting the multicast packet into a virtual multicast packet associated with the destination group, and reverse converting information for converting the virtual multicast packet back into the real multicast packet; and an information updating unit updating the self-retained group information, the self-retained second group information, the self-retained converting information and the self-retained reverse converting information on the basis of the group information, the second group information, the converting information and the reverse converting information given from another packet relay device.

According to the present invention, the information about the terminal group of the terminals serving as members of the target group is associated with the group information, and is transmitted and received between the respective packet relay devices.

With this scheme, the packet relay device according to the present invention automatically takes synchronization of the address information etc of the terminal group in the network where the plurality of terminals exists, whereby the addresses are automatically managed and automatically assigned so as not to cause any overlap, and consequently the network can be efficiently administered.

According to the present invention, it is possible to actualize the packet relay device capable of efficiently forwarding the communication packets from the plurality of terminals connected to the network.

BRIEF DESCRIPTION OF THE DRAWINGS

FIG. 5 is a diagram showing a routing table of GW-A in the first embodiment;

FIG. 11 is a diagram showing a routing table of GW-A in the second embodiment;

FIG. 15 is a diagram of a functional configuration of GW-A in a third embodiment; and FIG. 16 is a diagram showing a gateway-to-gateway synchronizing sequence in the third embodiment.

DESCRIPTION OF THE PREFERRED
EMBODIMENTS

A best mode (which will hereinafter be termed an embodiment) for carrying out the present invention will hereinafter be described with reference to the drawings.

Configurations in the following embodiments are exemplifications, and the present invention is not limited to the configurations in the embodiments.

First Embodiment

A gateway device (which will hereafter be simply referred to as the gateway) according to a first embodiment of the present invention will hereinafter be described.

[Network Architecture]

Figure 1:
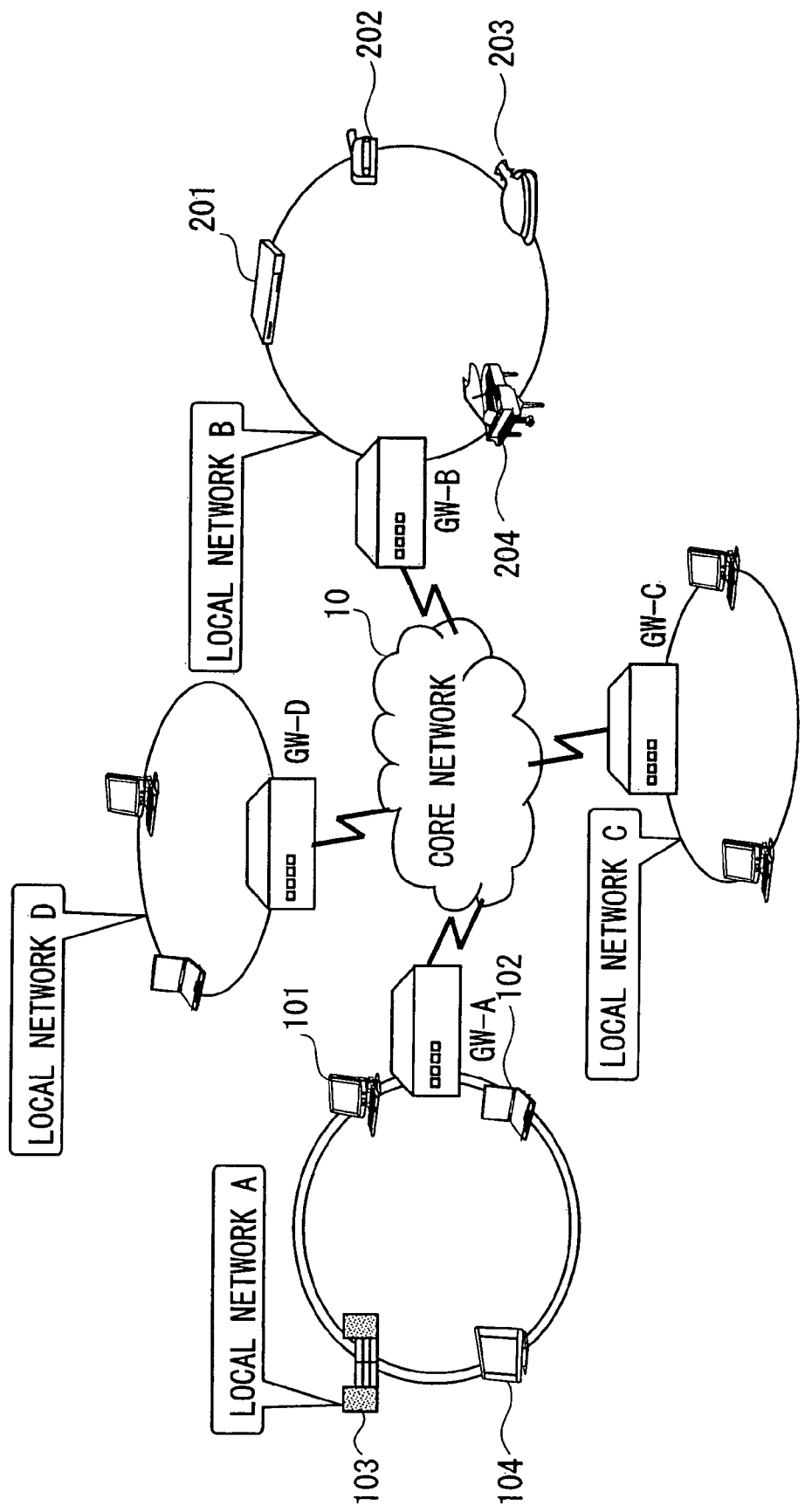
FIG. 1 is a view illustrating a network architecture.

To begin with, a network built up by the gateways according to the first embodiment will be explained with reference to FIG. 1. FIG. 1 is a view illustrating a network architecture in the first embodiment.

The network in the first embodiment is defined as an IP (Internet Protocol) network configured by local networks A, B, C and D and by a core network 10. The local networks A, B, C and D are connected, based on the IP, to each other via the core network 10. Further, terminals within the local networks A, B, C and D are connected to the core network 10 via gateways GW-A, GW-B, GW-C and GW-D. Namely, the gateways GW-A, GW-B, GW-C and GW-D are packet relay devices provided between the local networks A, B, C and D managed by these gateways and the core network 10.

Apparatuses (which will hereinafter be referred to as terminals) each having an IP communication function are connected to the respective local networks. Terminals 101-104 are connected to the local network A, and terminals 201-204 are connected to the local network B. A variety of apparatuses such as multiple personal computers (PCs), televisions, audio equipment and refrigerators are considered as these terminals. It is to be noted that the number of the terminals connected to the individual local networks is not limited to the number given in the first embodiment.

[Address Format]

An IP address is assigned to each terminal. In the IP network, a recipient and a sender are specified by the IP addresses. Given herein is an explanation of address formats with reference to FIG. 2, wherein the addresses are assigned to the respective terminals in the network illustrated in FIG. 1. A further explanation is about how the terminals having these address formats are organized into groups.

The IP utilized in the first embodiment is defined as IPv4 (Internet Protocol version 4), and the IP address assigned to each terminal is also an IPv4 address. It should be noted that the present invention is not limited to the IPv4, and, as a matter of course, IPv6 is also available. Further, the IP address assigned to each terminal involves using a local IP address that can be assigned without any restrictions in each local network. As a matter of course, in the present invention, the address assigned to each terminal is not limited to the local IP address, and a global IP address unique throughout the networks may also be assigned.

Figure 2:
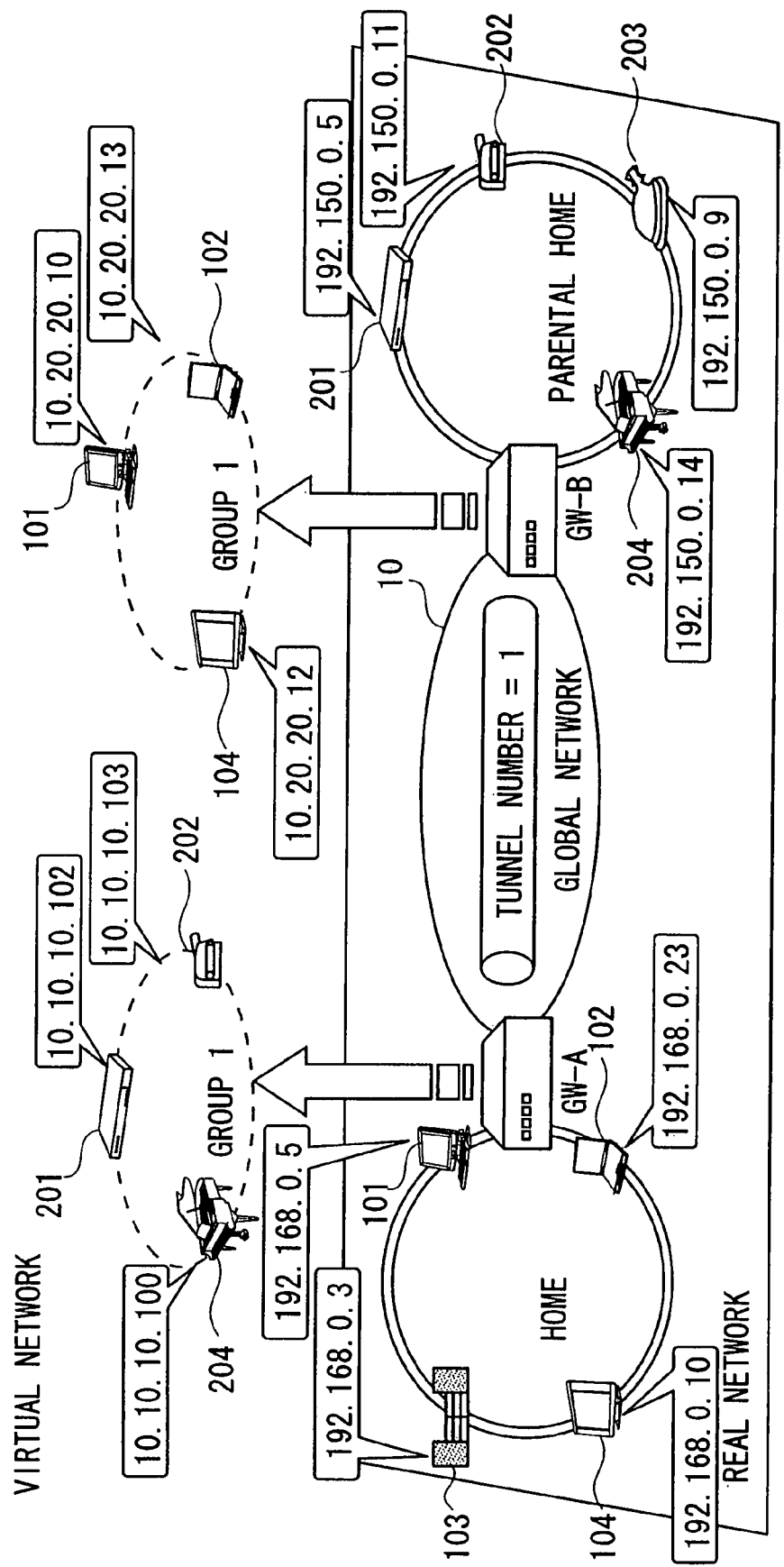
FIG. 2 is a view showing an address format in the network.

FIG. 2 shows the local networks A and B among the networks illustrated in FIG. 1. For example, it may be assumed that the local network A is a network built up in home of a user who utilizes this network, and the local network B is a network built up in parental home where parents of the user reside.

The following local IP addresses (the IP addresses given below are exemplifications) are set in the respective terminals connected to the local networks.

Local network A: terminal 101: [192.168.0.5]
Local network A: terminal 102: [192.168.0.23]
Local network A: terminal 103: [192.168.0.3]
Local network A: terminal 104: [192.168.0.10]
Local network B: terminal 201: [192.150.0.5]
Local network B: terminal 202: [192.150.0.11]
Local network B: terminal 203: [192.150.0.9]
Local network B: terminal 204: [192.150.0.14]

Then, the gateways GW-A and GW-B manage the virtual network in addition to the real networks. This is because the respective terminals connected to the local networks are grouped and managed. In the virtual network, the individual terminals are assigned the virtual IP addresses that differ for every belonging group. An assumption is that the terminals 101, 102 and 104 within the local network A and the terminals 201, 202 and 204 within the local network B, belong to a group 1. The terminals 103 and 203 do not belong to this group 1. The terminals belonging to the group 1 are assigned the virtual IP addresses, given below, for the group 1 and are managed by the respective gateways.

Group 1: terminal 101: [10.20.20.10]
Group 1: terminal 102: [10.20.20.13]
Group 1: terminal 104: [10.20.20.12]
Group 1: terminal 201: [10.10.10.102]
Group 1: terminal 202: [10.10.10.103]
Group 1: terminal 204: [10.10.10.100]

The terminal performs, by use of the IP address assigned to the terminal, communications with other terminals within the local network to which the self-terminal is connected and with the terminals within other local networks via the core network 10. For instance, the terminal 101, in the case of performing the communications with the terminal 201 within the local network B, transmits an IP packet of which a destination address is a virtual IP address [10.10.10.102] of the terminal 201. The transmitted IP packet is relayed by the gateway GW-A, the core network 10 and the gateway GW-B and is received by the terminal 201.

The thus-transmitted-and-received IP packet has, in a packet header part, a destination address field (which will hereinafter be referred to as a destination address or abbreviated to DA (Destination Address)) in which to set a destination IP address, and a source address field (which will hereinafter be referred to as a source address or abbreviated to SA (Source Address)) in which to set a source IP address as a piece of information about a sender of this packet. The terminal 201 receiving the IP packet refers to the source address in the IP packet and is thereby enabled to know which terminal this packet is sent from.

Further, a broadcast packet and a multicast packet have a broadcast address prepared for broadcast and a multicast address prepared for multicast, which are set as destination addresses in their packet headers. For example, the broadcast address is defined as an address of which bits corresponding to a host address are all "1" (if a network address defined in Class C is [192.168.1.0], the broadcast address is defined by [192.168.1.255]).

[Device Configuration]

Figure 3:
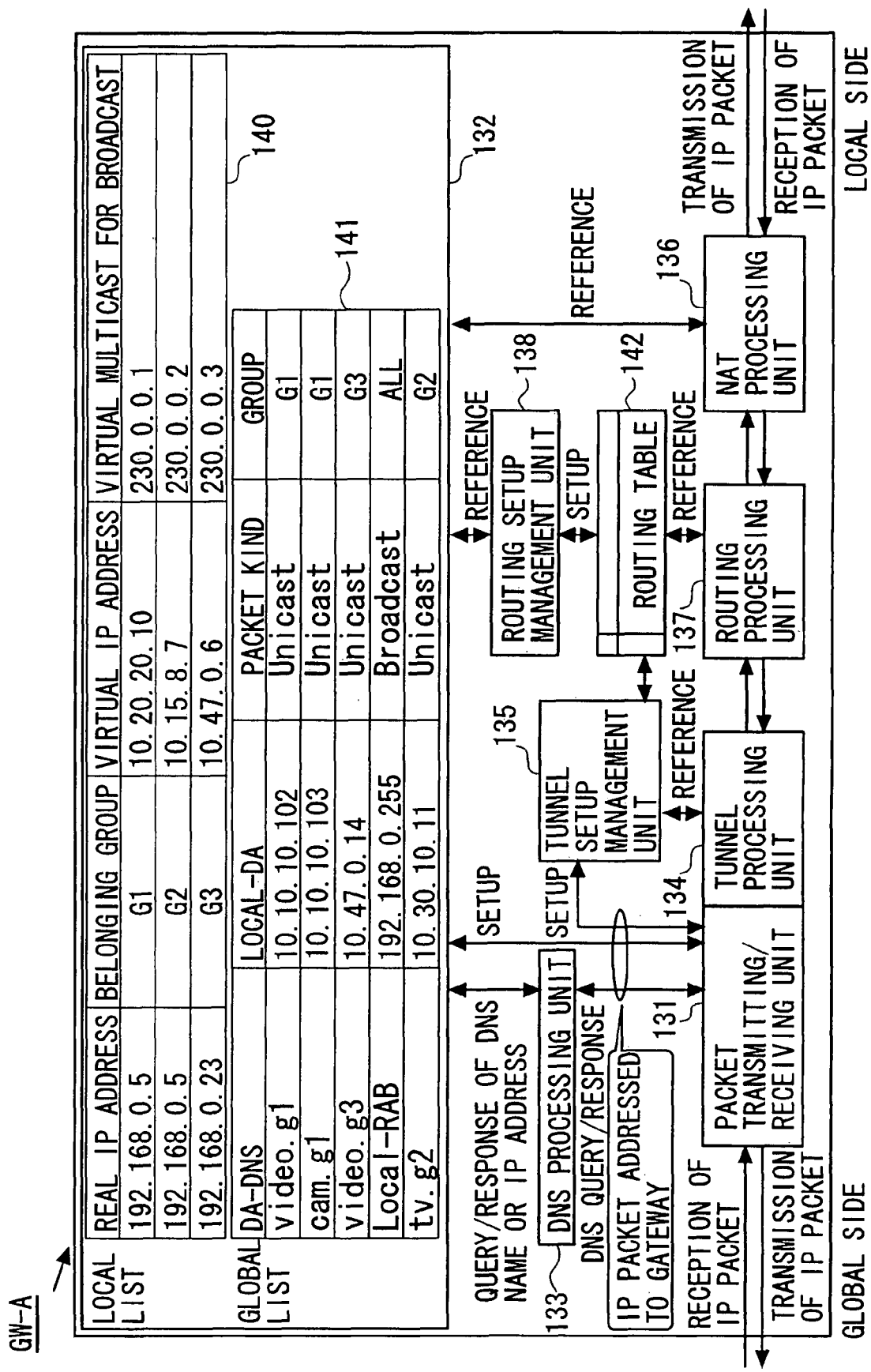
FIG. 3 is a diagram of a functional configuration of GW-A in a first embodiment.
Figure 4:
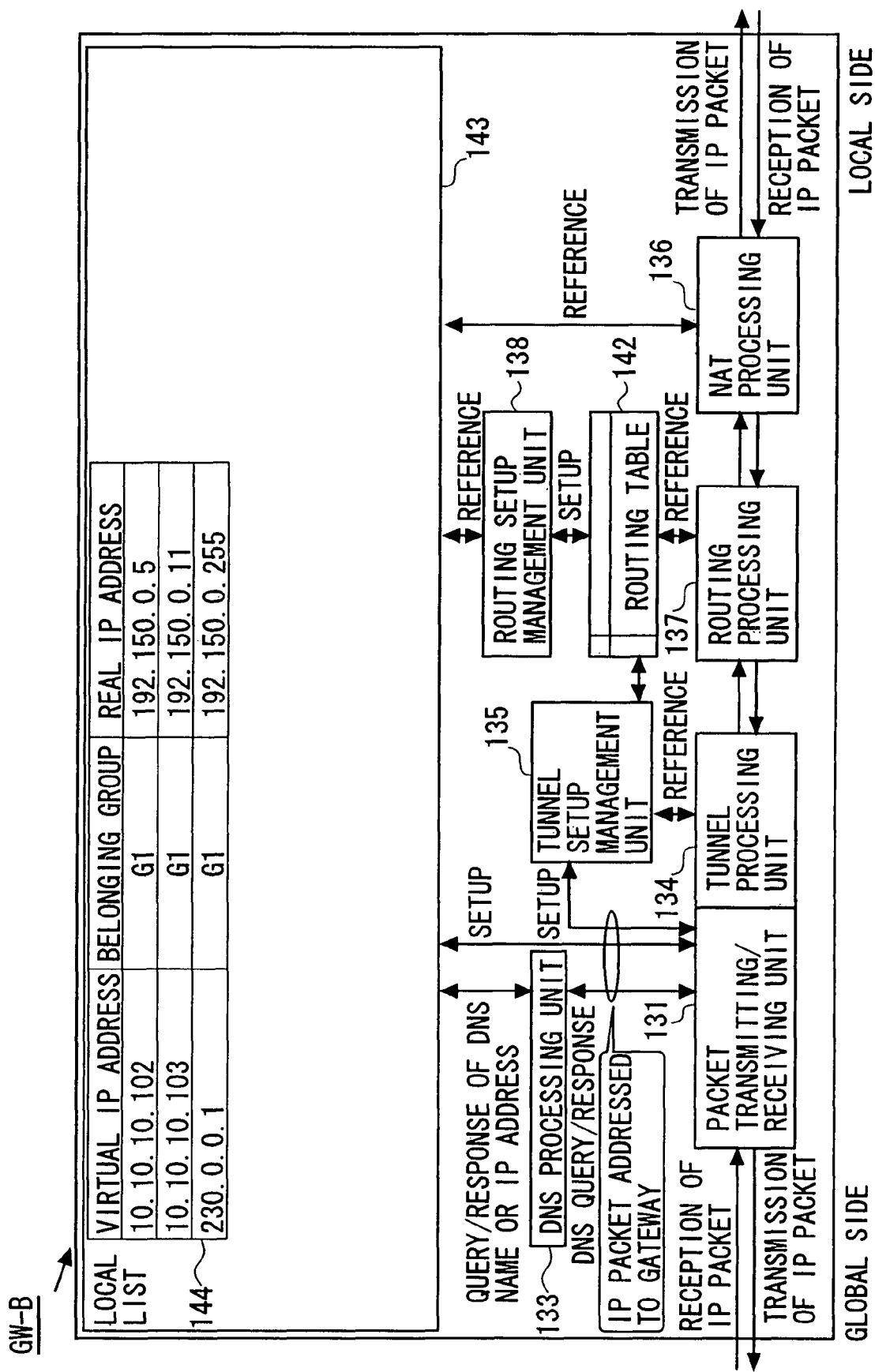
FIG. 4 is a diagram of a functional configuration of GW-B in the first embodiment.

Next, a functional configuration of the gateway device according to the first embodiment will be described with reference to FIGS. 3 - 5. FIG. 3 is a block diagram showing the functional configuration of the gateway GW-A. FIG. 4 is a block diagram showing the functional configuration of the gateway GW-B. FIG. 5 is a diagram showing a routing table 142 of the gateway GW-A. Note that the gateways GW-A, GW-B, GW-C and GW-D are the same devices and therefore have the same function blocks.

The gateway device in the first embodiment is constructed of, as illustrated in FIG. 3, a packet transmitting/receiving unit 131 (corresponding to a transferring unit and a virtual packet receiving unit according to the present invention), a group member list (Local→Global) management unit 132, a DNS (Domain Name System) processing unit 133, a tunnel processing unit 134, a tunnel setup management unit 135, a NAT processing unit 136 (corresponding to an acquisition unit, a translation unit, a receiving unit, a packet conversion unit, a transmitting unit, a virtual address extraction unit, a virtual address acquisition unit, a packet group acquisition unit and a group determination unit according to the present invention), a routing processing unit 137, a routing setup management unit 138, a routing table 142, and a group member list (Global→Local) management unit 143 shown in FIG. 4. Namely, the gateway in the first embodiment is constructed of the components shown in FIG. 3 and the group member list (Global→Local) management unit 143 in FIG. 4. The individual function units will hereinafter be described. The following description will exemplify an example in which the gateway GW-B has the group member list (Global→Local) management unit 143, while the gateway GW-A has other function units.

<Group Member List (Local→Global) Management Unit 132>

The group member list (Local→Global) management unit 132 is a function unit that manages various items of information about the respective terminals within the local network A (to which the gateway GW-A is connected) managed by the gateway GW-A. The group member list (Local→Global) management unit 132 is employed when relaying the IP packet transmitted by the terminal within the local network A to other local networks B-D. The group member list management unit 132 has a local list 140 and a global list 141.

<<Local List 140>>

The local list 140 is a list of information on the individual terminals within the local network A. The local list 140 retains the following items of information for every terminal.

Real IP address field: IP address set actually in the terminal.

Belonging group (G) field: Group to which the terminal belongs.

Virtual IP address field: Virtual IP address of the terminal in the belonging group.

Virtual multicast field for broadcast: Virtual multicast address used when forwarding a broadcast packet transmitted from the terminal within the local network A to other gateways.

Namely, the local list 140 retains, for every terminal, respective items of information on a group-by-group basis, to which the terminals belong. If a certain terminal belongs to two or more groups, it follows that the local list 140 contains two or more lists showing the same terminal.

<<Global List 141>>

The global list 141 retains the information about the terminals within other destination local networks (the local networks B, C and D) and the information about the broadcast packets transmitted by the terminals within the self local network. Namely, the global list 141 retains the following items of information on a destination-by-destination basis enabling designation to be made by the terminals within the local network.

DA-DNS (Destination Address-Domain Name System) name field: Management name consisting of a host name and a group name of the destination terminal. The first embodiment takes a format in which the host name and the group name of the terminal are delimited by ". (period)" (such as "video.gl" shown in FIG. 3). Note that the DNS name is not restricted by the first embodiment and may be, it is sufficient, managed in the way of being distinguishable between the host name and the group name.

LOCAL-DA (Destination Address) (destination designated address) field: Destination virtual IP address that can be designated by each of the terminals within the local network A. This destination virtual IP address includes a destination IP address for the broadcast packet.

Packet type field: Packet type of a data packet of which the destination virtual IP address is designated. There are the data packets for the unicast communications ("Unicast" illustrated in FIG. 3) and for the broadcast communications ("Broadcast" shown in FIG. 3).

Belonging group (G) field: Group information to which the DNS name and the destination designated address belong.

<Group Member List (Global→Local) Management Unit 143>

The group member list (Global→Local) management unit 143 is a function unit that manages various items of information on the individual terminals within the local network (to which the gateway is connected) managed by the gateway. The group member list (Global→Local) management unit 143 is employed when the packet relayed from another gateway is further relayed to the local network managed by the self-gateway. The group member list (Global→Local) management unit 143 has a local list 144.

<<Local List 144>>

The local list 144 is a list of information about the respective terminals within the local network. The local list 144 retains the following items of information for every terminal.

Real IP address field: IP address set actually in the terminal.

Belonging group (G) field: Group to which the terminal belongs.

Virtual IP address field: Virtual IP address of the terminal in the belonging group.

Namely, the local list 144 retains, for every terminal, the respective items of information on the group-by-group basis, to which the terminals belong. If a certain terminal belongs to two or more groups, it follows that the local list 144 contains two or more lists showing the same terminal.

<DNS Processing Unit 133>

The DNS processing unit 133 refers to the global list 141 of the group member list (Local→Global) management unit 132 and thus acquires, from a DNS name, a destination designated IP address associated with this DNS name and acquires, conversely, from the IP address, a DNS name associated with this IP address. The DNS name connoted herein is a management name into which the host name attached for every terminal and the terminal belonging group name are combined. For instance, the management name [video.g1] shown in FIG. 3 is a name into which the host name [video] of the terminal and the terminal belonging group name [g1] are combined.

Further, the DNS name contains a name attached for every broadcast address. For example, a DNS name [Local-RAB] shown in FIG. 3 is a name for the broadcast. Each terminal, when desiring to transmit the packet to all of the groups to which the self-terminal belongs, knows, it may be enough, this DNS name [Local-RAB], and can know, by querying the gateway GW-A about the DNS name, a broadcast address [192.168.0.255] associated with this DNS name.

<Packet Transmitting/Receiving Unit 131>

The packet transmitting/receiving unit 131 is a function unit that receives the IP packet from the core network 10 or transmits the IP packet from the terminal within the local network A to the core network 10. The packet transmitting/receiving unit 131 requests other function units to process the received IP packets according to the types of the IP packets. The packet transmitting/receiving unit 131 determines from a port number in the IP packet whether the received packet is a self-addressed IP tunnel packet or a self-addressed control IP packet. As a result, if the port number is determined to be an IP port number (or a protocol number) for the IP tunnel, the packet transmitting/receiving unit 131 transfers the received IP packet to the tunnel processing unit 134.

<Tunnel Setup Management Unit 135>

The tunnel setup management unit 135 executes a process about IP tunneling with the gateway. The tunnel setup management unit 135, when a new facing gateway is set in the routing table 142, generates an IP tunnel led to this facing gateway. Conversely, the tunnel setup management unit 135, when the facing gateway set in the routing table 142 is deleted, removes the generated IP tunnel. Further, the tunnel setup management unit 135 terminates the generated IP tunnel.

<Tunnel Processing Unit 134>

The tunnel processing unit 134 is a function unit that extracts the IP packet from the data transmitted via the IP tunnel generated by the tunnel setup management unit 135. The tunnel processing unit 134, if, e.g., IPSec is used as an IP tunneling technology (protocol), extracts a desired IP packet by decrypting the encrypted data. The IP packet extracted by the tunnel processing unit 134 is transferred to the routing processing unit 137.

Further, the tunnel processing unit 134, when receiving forwarding destination gateway information and the IP packet from the routing processing unit 137, processes the IP packet (such as attaching a header) in order to transmit the IP packet via the generated IP tunnel led to the forwarding destination gateway. The processed IP packet is transferred to the packet transmitting/receiving unit 131 and then transmitted therefrom.

<Routing Table 142>

The routing table 142 is a table used for the routing processing unit 137 to determine which gateway the received IP packet should be forwarded to. The routing table 142 of the gateway GW-A retains, as illustrated in FIG. 5, the following items of information.

Input port field: Information specifying whether the received IP packet is a packet from the local network A ("LOCAL" shown in FIG. 4) or a packet received via the core network 10 from another gateway (a tunnel port on the "GLOBAL" side).

Destination address field: Information specifying a destination IP address designated as a destination of the received IP packet.

Net mask field: Information specifying a bit count, used for a network address, in the IP address in the case of managing the network in a way that segments the network into subnets.

Output port field: Information specifying a facing gateway to which the IP packet should be forwarded when the input port of the received IP packet is "LOCAL".

<Routing Processing Unit 137>

The routing processing unit 137 is a function unit that determines whether the received IP packet is forwarded to within the local network A or to another gateway. The routing processing unit 137 refers to the routing table 142 for making the determination. For instance, if the IP packet is a packet transferred from the tunnel processing unit 134, the routing processing unit 137 searches the routing table 142 for a record containing the facing gateway entered in the input port field and the destination IP address of the IP packet that is entered in the destination address field. As a result of the search, if the searched record exists therein, the routing processing unit 137 determines to forward a copy of the IP packet to the gateway set in the output port field of the searched record.

While on the other hand, if the IP packet is a packet received from the local network, the routing processing unit 137 searches the routing table 142 for a record containing "LOCAL" entered in the input port field and the destination IP address of the IP packet that is entered in the destination address field. As a result of the search, if the searched record exists therein, the routing processing unit 137 determines to forward the IP packet to the gateway set in the output port field of this searched record. In this case, the routing processing unit 137 transfers the gateway information set in the output port field of the searched record to the tunnel processing unit 134 together with the IP packet.

<NAT Processing Unit 136>

The NAT processing unit 136 is a function unit having a NAT (Network Address Translation) function of translating the destination IP address or the source IP address of the IP packet, and a filtering function for the IP packet.

To start with, an outline of the NAT function of the NAT processing unit 136 will hereinafter be described. The NAT processing unit 136 executes an address translation process corresponding to an IP packet forwarding direction (destination). In the case of forwarding the IP packet (the IP packet from the core network 10) received from the tunnel processing unit 134 to within the local network A, the NAT processing unit 136 refers to the local list 144 and thus translates the destination address (the virtual IP address is set therein) of the IP packet into a real IP address. Further, in the case of forwarding the IP packet from the terminal within the local network A managed by the self-gateway to the facing gateway, the NAT processing unit 136 rewrites the destination address and the source address of the IP packet.

Next, an outline of the filtering function of the NAT processing unit 136 will hereinafter be described. The NAT processing unit 136 determines, from the destination address and the source address of the received IP packet, whether this IP packet is a forwarding-enabled packet or not. To be specific, the NAT processing unit 136 determines, based on the extracted address, whether or not the source IP address and the destination IP address belong to the same group by referring to the group member list management unit 132, thereby determining whether the packet is the forwarding-enabled packet or not.

[Operational Example]

Figure 6:
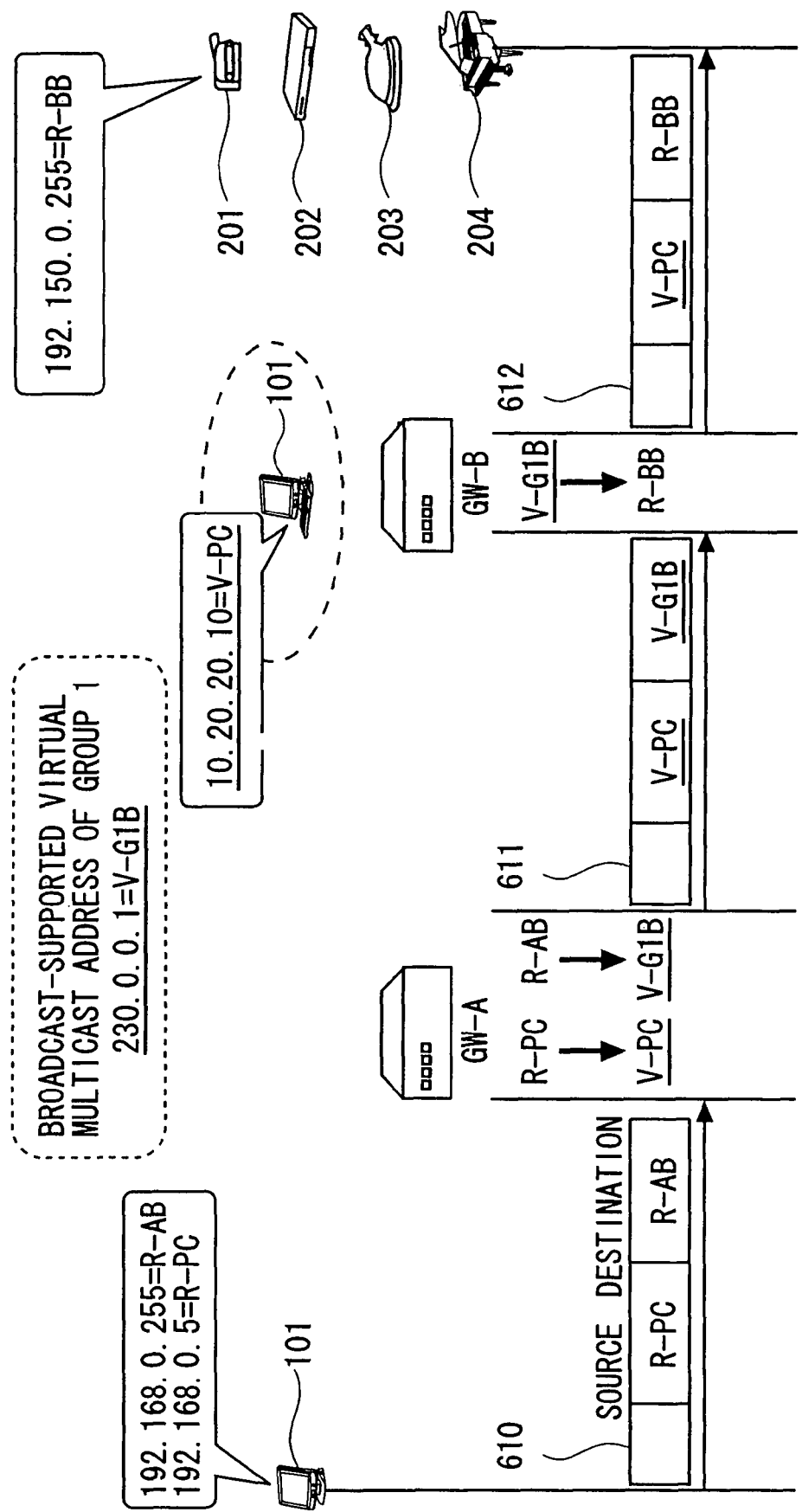
FIG. 6 is a diagram showing how a packet is forwarded in the first embodiment.
Figure 7:
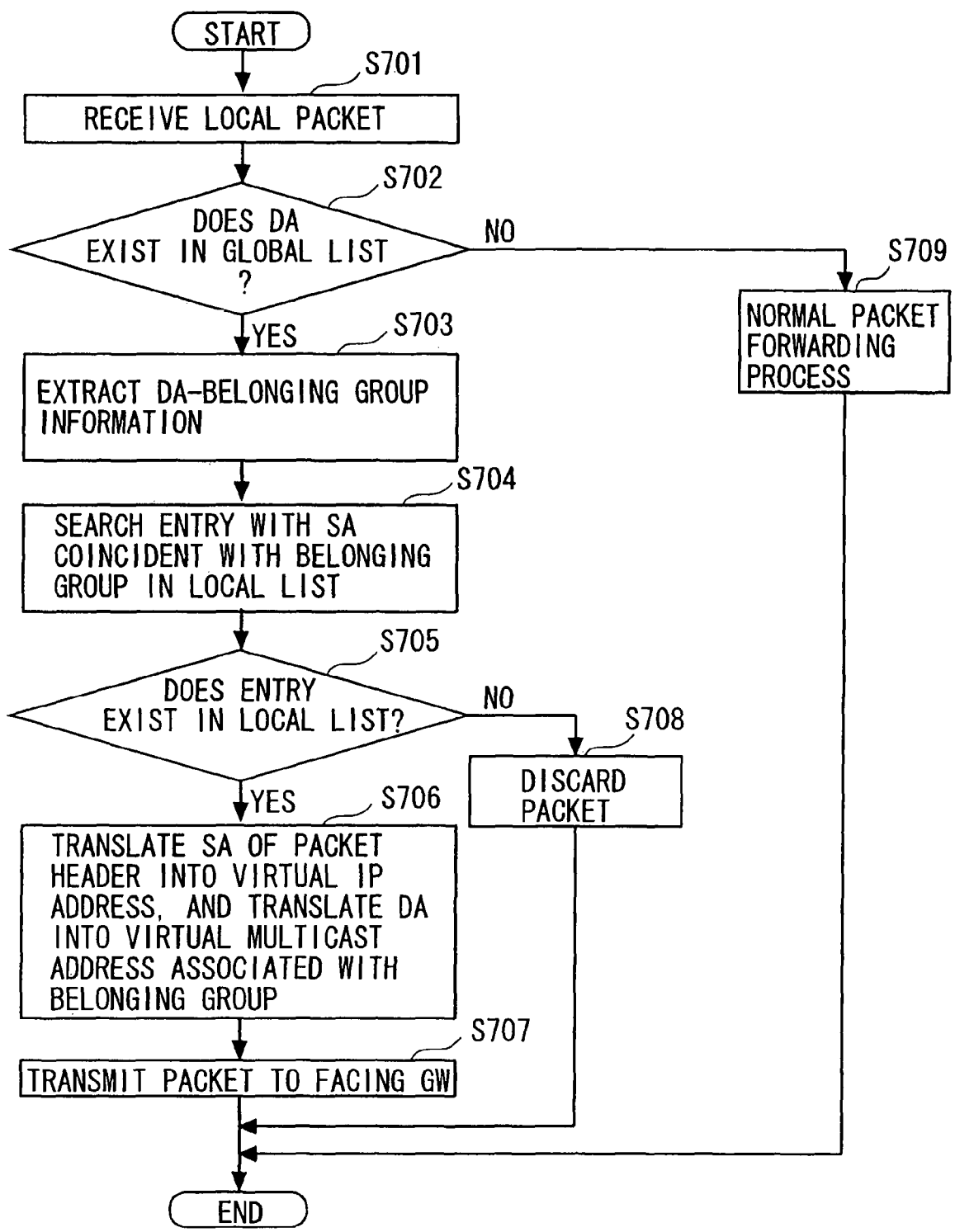
FIG. 7 is a diagram showing a packet processing flow (Local→Global) in the first embodiment.
Figure 8:
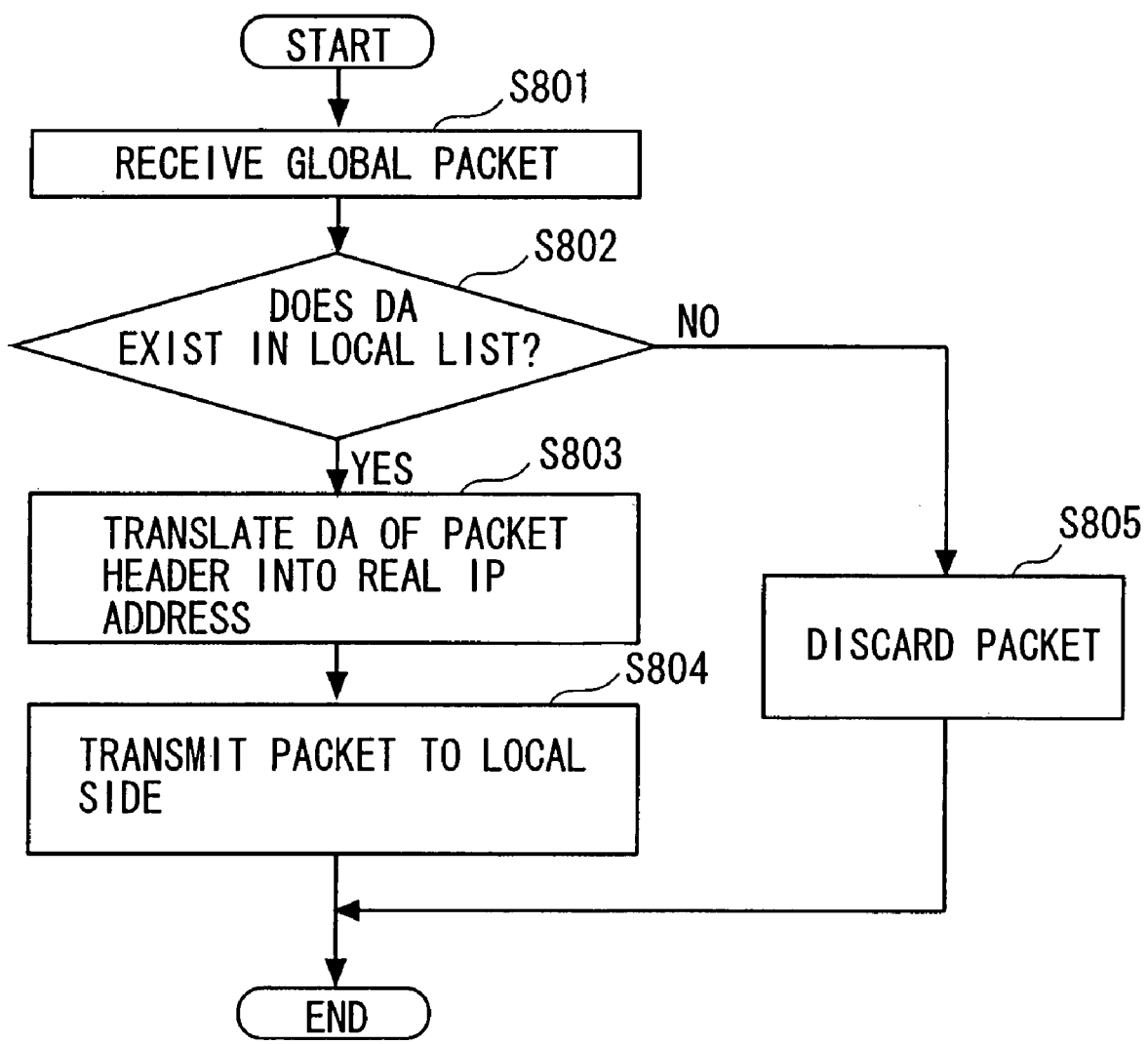
FIG. 8 is a diagram showing the packet processing flow (Global→Local) in the first embodiment.

Next, an operational example of the gateway in the first embodiment will be explained with reference to FIGS. 6-8. Herein, the operation of the present gateway is categorized into a forwarding operation in the case of receiving the broadcast packet from the terminal within the local network managed by the self-gateway, and into an operation in the case of transmitting and receiving the data between the gateways, wherein at first these categorized operations will be outlined, and thereafter in-depth operation flows will be described.

<Forwarding of Broadcast Packet>

To begin with, the outline of the operation of the present gateway when forwarding the broadcast packet will be explained with reference to FIG. 6. FIG. 6 is a diagram showing how the packet is forwarded when the gateway GW-A receives the broadcast packet from the terminal 101 within the local network A.

The gateway GW-A, when receiving a broadcast packet 610 (containing a destination address [192.168.0.255] and a source address [192.168.0.5]) transmitted by the terminal 101 (having a real IP address [192.168.0.5]), extracts the destination address [192.168.0.255] and the source address [192.168.0.5] of this packet.

The gateway GW-A determines, based on the extracted destination address and source address, whether the packet should be forwarded to the facing gateway (toward the core network 10) or not. The gateway GW-A, when determining that the packet should be forwarded, translates the destination address and the source address of the packet into virtual IP addresses. The thus-translated virtual IP addresses are addresses associated with the forwarding destination group. An example in FIG. 6 is that the broadcast address [192.168.0.255] is translated into a virtual multicast address [230.0.0.1]. Furthermore, the source address [192.168.0.5] is translated into a virtual IP address [10.20.20.10] specifying the terminal 101 in the target group. The thus-address-translated packet 611 is forwarded to the gateway GW-B via the IP tunnel.

The gateway GW-B, when receiving the packet 611 forwarded from the gateway GW-A, extracts the destination address [230.0.0.1] and the source address [10.20.20.10] of the packet. The gateway GW-B determines, based on the extracted destination address and source address, whether or not the packet should be forwarded to within the local network B. The gateway GW-B, when determining that the packet should be forwarded, translates the destination address of the packet into the real broadcast address [192.150.0.255] associated with the local network B from the virtual IP address. The thus-address-translated packet 612 is transmitted to the local network B and is received by the terminal group (the terminals 201-204) associated with the broadcast address.

<Gateway-to-Gateway Communications>

Next, an outline of the operation of the present gateway in the case of transmitting and receiving the packet between the gateways, will be described. Each of the gateways GW-A, GW-B, GW-C and GW-D, in the case of forwarding the broadcast packet from within the local network managed by the self-gateway to another network, forwards the packet to another gateway via the core network 10. The gateway-to-gateway communications involve utilizing, e.g., the IP tunneling technology. The IP tunneling technology is exemplified by, e.g., PPTP (Point to Point Tunneling Protocol), IPSec (IP Security Protocol), etc. Thus, the tunneling technology is utilized for the gateway-to-gateway communications, thereby enabling the high-security communications to be assured even when the core network 10 is a public communication network such as the Internet.

The gateway GW-A, in the case of forwarding the broadcast packet transmitted from the terminal (e.g., the terminal 101) within the local network A to the terminal group within the local network B, generates the IP tunnel (the tunnel number=1 shown in FIG. 1) with the gateway GW-B, and forwards the packet via this IP tunnel to the gateway GW-B.

The routing processing unit 137 of each gateway functions to forward the packet to between the gateways. The routing processing unit 137 refers to the routing table 142 and thus determines whether or not the forwarded packet (containing the virtual multicast address designated as the destination) should be further forwarded to another gateway. When determining that the packet should be forwarded, a copy of the packet is forwarded via the IP tunnel led to the facing gateway set in the routing table 142. The reason why to use the copy lies in a necessity of being forwarded to within the local network.

<Operation Flow>

The operation of each of the function units of the present gateway for realizing the broadcast packet forwarding function described above, will hereinafter be explained following the example of the packet forwarding illustrated in FIG. 6.

At the very outset, the operation of each of the function units on the occasion of forwarding the broadcast packet to the core network from the local network, will be described with reference to FIG. 7. FIG. 7 is a flowchart showing the packet processing by the present gateway on the occasion of forwarding the broadcast packet to the core network from the local network.

The NAT processing unit 136 of the gateway GW-A receives the broadcast packet (containing the destination address [192.168.0.255] and the source address [192.168.0.5]) from the terminal 101 within the local network A (S701). The NAT processing unit 136 acquires the destination address [192.168.0.255] and the source address [192.168.0.5] of this packet. Next, the NAT processing unit 136 searches for a record containing the acquired destination address (the broadcast address) [192.168.0.255] set in the destination designated address field of the global list 141 (S702). As a result, if this record exists in the global list 141 (S702; YES), the NAT processing unit 136 extracts a piece of information set in the belonging group field of this record (S703). In this case, [ALL] is extracted as the information set in the belonging group field of the record, and hence the NAT processing unit 136 recognizes that the broadcast packet should be forwarded to all of the groups. Note that the NAT processing unit 136, if none of such a record exists as a result of searching the global list 141 (S702; NO), executes a normal packet forwarding process (S709). The normal packet forwarding connotes the packet forwarding that does not entail grouping according to the present invention.

The NAT processing unit 136 searches for a record containing the acquired source address [192.168.0.5] and the belonging group information, which are entered respectively in the real IP address field and in the belonging group field of the local list 140 (S704). As a result, if this record exists in the local list 140 (S705; YES), the NAT processing unit 136 determines that the broadcast packet should be forwarded, and acquires the virtual IP address and the multicast address for the broadcast from the record. In this example, the belonging group information acquired previously is [ALL], and therefore the two records containing the address [192.168.0.5] entered in the real IP address field of the local list 140, are extracted. Acquired from these extracted records are a virtual IP address [10.20.20.10] and a virtual multicast address [230.0.0.1] for the broadcast in the group 1 (G1) and a virtual IP address [10.15.8.7] and a virtual multicast address [230.0.0.2] for the broadcast in the group 2 (G2).

It is to be noted that the NAT processing unit 136, if there is none of the relevant record as a result of searching the local list 140 (S705; NO), determines that the terminal as the packet sender does not belong to the transmissible group, and discards the broadcast packet (S708).

For forwarding the broadcast packet to each of the two groups acquired, the NAT processing unit 136 generates copies of the received broadcast packets. The NAT processing unit 136 employs one of the generated broadcast packets for the group 1 and another packet for the group 2. Then, the NAT processing unit 136 translates the destination address of the packet for the group 1 into [230.0.0.1] and the source address into [10.20.20.10]. Similarly, the NAT processing unit 136 translates the destination address of the packet for the group 2 into [230.0.0.2] and the source address into [10.15.8.7]. The NAT processing unit 136 transfers the address-translated packet for the group 1 and the address-translated packet for the group 2 to the routing processing unit 137.

The routing processing unit 137 extracts the destination addresses from the transferred IP packets. To exemplify the packet for the group 1, the address [230.0.0.1] is acquired as the destination address. The routing processing unit 137 searches the routing table for a record containing "LOCAL" entered in the input port field and [230.0.0.1] entered in the destination address field. The routing processing unit 137 transfers, to the tunnel processing unit 134, the facing gateway information (the gateway GW-B) set in the output port field of the searched record and the packet for the group 1. The packet for the group 2 is similarly processed.

The tunnel processing unit 134, for transmitting the packet for the group 1 via the IP tunnel generated with respect to the gateway GW-B specified by the transferred facing gateway information, processes the packet for the group 1 and transfers the processed packet to the packet transmitting/receiving unit 131. Here at, the tunnel setup management unit 135 sets up the IP tunnel between the gateway GW-B and the present gateway GW-A. The packet for the group 2 is similarly processed.

The packet transmitting/receiving unit 131 transmits the transferred packets (for the group 1 and the group 2) toward the core network 10 (S707).

Next, an operation of each of the function units when forwarding the packet to the local network from the core network, will be described with reference to FIG. 8. FIG. 8 is a flowchart showing a packet processing flow by the present gateway on the occasion of forwarding the packet to the local network from the core network. The following discussion proceeds based on an operation when the gateway GW-B receives the packet (the virtual multicast packet (containing the destination address [230.0.0.1] and the source address [10.20.20.10]) for the group 1 that is transmitted by the gateway GW-A.

The packet transmitting/receiving unit 131 of the gateway GW-B receives the virtual multicast packet (containing the destination address [230.0.0.1] and the source address [10.20.20.10]) from the facing gateway GW-A (S801). The packet transmitting/receiving unit 131, upon recognizing that the packet is a packet sent via the IP tunnel from the facing gateway GW-A, transfers this packet to the tunnel processing unit 134.

The tunnel processing unit 134 extracts a desired IP packet from within the packets forwarded via the IP tunnel, and transfers the extracted packet and the facing gateway information (the gateway GW-A) as the forwarder of this packet to the routing processing unit 137.

The routing processing unit 137 transfers the transferred IP packet to the NAT processing unit 136 as it is. On the other hand, the routing processing unit 137 determines whether or not the transferred IP packet should be forwarded to other facing gateways GW-C and GW-D. On the occasion of this determination, the routing processing unit 137 extracts the destination address [230.0.0.1] from the IP packet. The routing processing unit 137 searches the routing table 142 for a record containing the gateway GW-A entered in the input port field and the address [230.0.0.1] entered in the destination address field. As a result of the search, if the relevant record exists, the routing processing unit 137 transfers the facing gateway information set in the output port field of this record and a copy of this IP packet to the tunnel processing unit 134. With this processing, it follows that the IP packet is further forwarded to other gateways.

The NAT processing unit 136 receiving the IP packet from the tunnel processing unit 134 acquires the destination address [230.0.0.1] of the packet. The NAT processing unit 136 searches for a record containing the acquired destination address [230.0.0.1] set in the virtual IP address field of a local list 144 (S802). As a result, if the relevant record exists in the local list 144 (S802; YES), the NAT processing unit 136 determines that the packet should be forwarded, and acquires the real broadcast address [192.150.0.255] set in the real IP address field of the record. Note that the NAT processing unit 136, as a result of searching the local list 144, if no relevant record exists (S802; NO), discards this packet (S805).

The NAT processing unit 136 translates the destination address of the packet into an address [192.150.0.255] (S803). The NAT processing unit 136 forwards the address-translated packet toward the local network B (S804).

Operation/Effect in First Embodiment

The gateway in the first embodiment forwards the broadcast packet transmitted by the terminal to all of the groups to which the terminal 101 belongs. In this gateway, on the occasion of forwarding the packet, the NAT processing unit 136 executes the NAT (Network Address Translation) process.

To be specific, the present gateway translates the source address and the destination address (the broadcast addresses) of the broadcast packet sent from the terminal 101 into the virtual IP address and the virtual multicast address that are managed for every forwarding destination group, and transmits this address-translated packet. Further, in the case of receiving the address-translated packet, the gateway translates the destination address of the packet into the real broadcast address associated with the virtual multicast address set in the received packet, and forwards this packet.

The gateways in the first embodiment manage, it may be sufficient, the virtual IP addresses in the respective local networks, and it is feasible to eliminate intricacy of the address management in the large-scale network system.

Further, the NAT processing unit 136 of the present gateway, when receiving the broadcast packet from the terminal 101, refers to the global list 141 and the local list 140, thereby recognizing all of the groups to which the terminal 101 belongs and forwarding the broadcast packet to a group of the terminals defined as the members of all of these groups.

With this operation, each of the terminals desiring to transmit the broadcast packet can, without being aware of where the terminal group as the members within the self-terminal belonging group is located on the network, transmit the broadcast packet to the members of all of the groups to which the self-terminal belongs.

Moreover, to describe the operation in other words, the NAT processing unit 136 of the present gateway, when receiving the broadcast packet from the terminal, does not forward the broadcast packet to the groups to which this terminal does not belong. Furthermore, if the terminal belongs none of such groups, the NAT processing unit 136 does not forward the broadcast packet. Further, when receiving the packet from the core network, the present gateway refers to the local list 144 and, if the local list 144 does not contain the virtual multicast address set in the destination address field of the packet, discards this packet.

With this operation, the present gateway enables the broadcast within the group with the high security to be realized in the closed network wherein the terminals are grouped.

Further, the gateway in the first embodiment converts the broadcast packet sent from within the local network into the virtual multicast packet, and forwards the packet to another gateway. The gateway-to-gateway communications involve utilizing the IP tunnel generated between the gateways and also using the routing tables 142 within the gateways.

With this operation, in the case of forwarding the broadcast packet, the forwarding method corresponding to the network architecture between the gateways can be adopted by changing the settings in the routing tables 142 of the individual gateways. Namely, in the case of forwarding the packet to the plurality of gateways from the single gateway, without establishing the connections such as via the IP tunnels between all other gateways from the single gateway, the packet can be forwarded eventually to all of the gateways via other gateways.

Second Embodiment

The gateway device according to a second embodiment of the present invention will hereinafter be described. The gateway device in the first embodiment discussed earlier has the respective functions for realizing the broadcast within the network where the individual terminals are grouped. The second embodiment will exemplify, in addition to the broadcast, the gateway device that realizes intra-group multicasting. The network architecture and the address format shall be the same as those in the first embodiment illustrated in FIG. 1.

[Configuration of Device]

Figure 9:
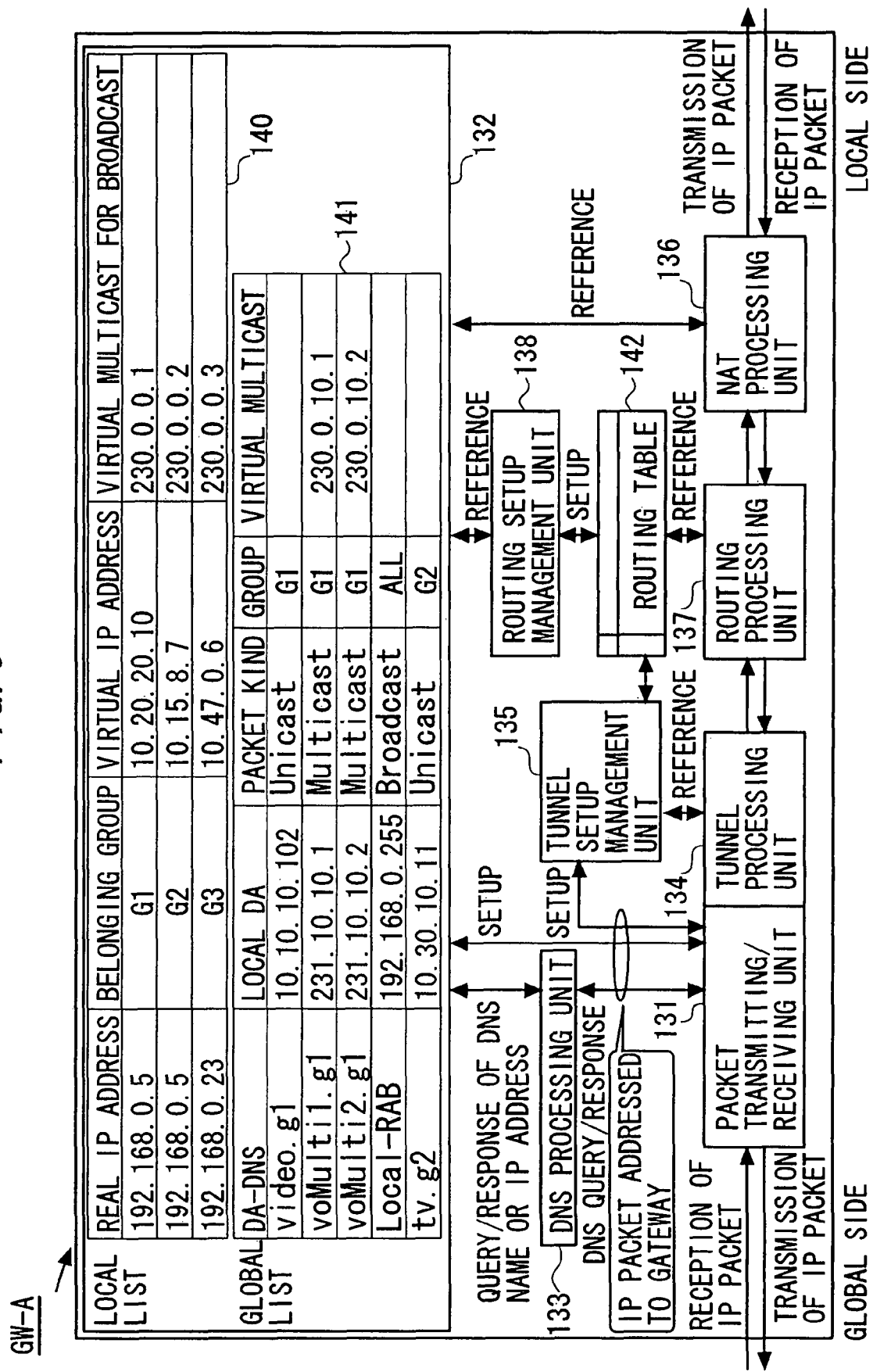
FIG. 9 is a diagram of a functional configuration of GW-A in a second embodiment.
Figure 10:
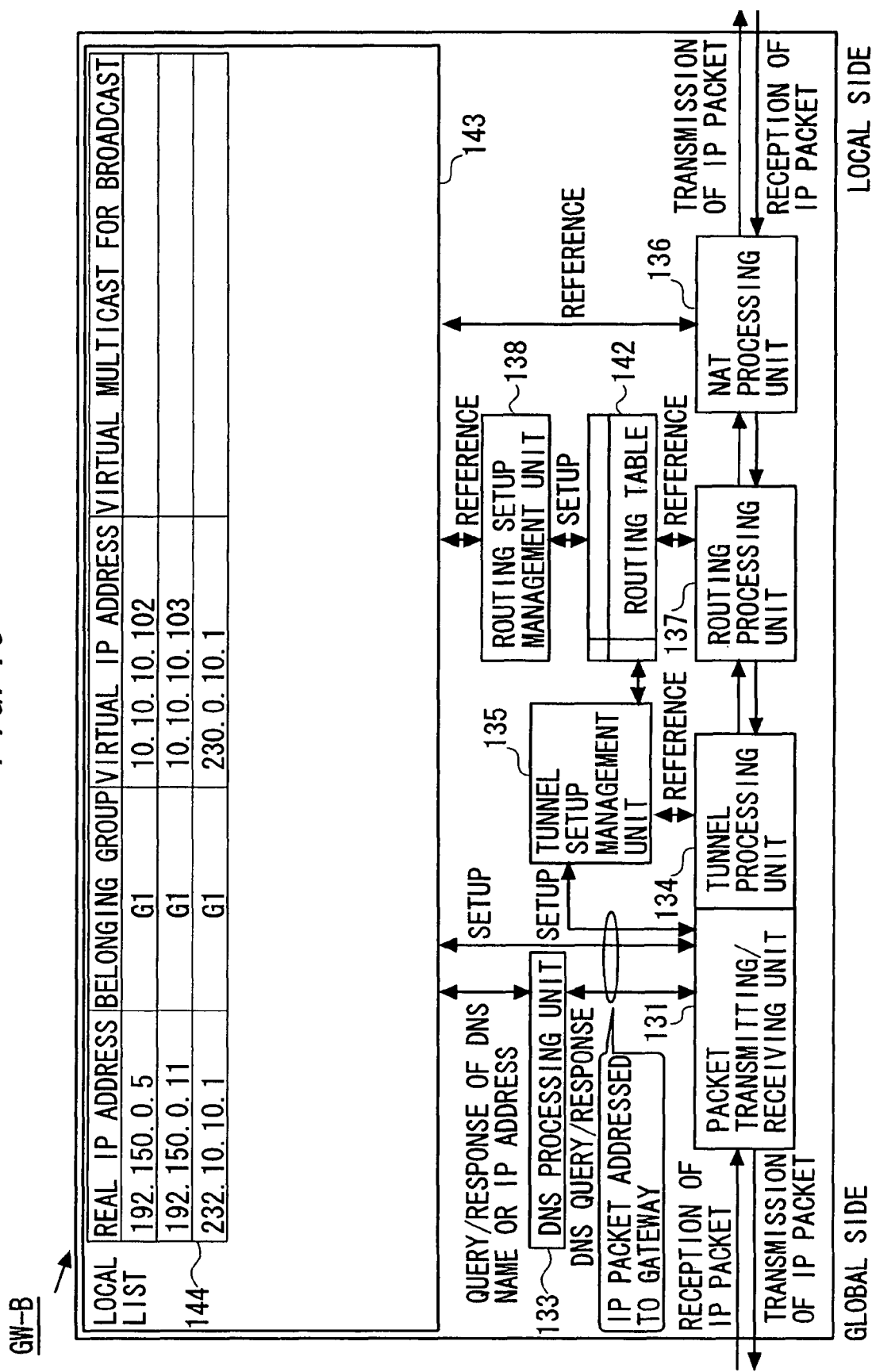
FIG. 10 is a diagram of a functional configuration of GW-B in the second embodiment.

The gateway according to the second embodiment is constructed of the same function units as in the first embodiment, wherein these function units are slightly different in their operations. The different operations from those in the first embodiment will be described with reference to FIGS. 9-11. FIG. 9 is a block diagram showing a functional configuration of the gateway GW-A in the second embodiment. FIG. 10 is a block diagram showing a functional configuration of the gateway GW-B in the second embodiment. FIG. 11 is a diagram illustrating the routing table 142 of the gateway GW-A in the second embodiment. The gateway in the second embodiment is constructed of the components shown in FIG. 9 and of the group member list (Global→Local) management unit 143 in FIG. 10. Herein, the gateway GW-A will be exemplified. Further, the following discussion will omit the descriptions of the same functions of the function units as in the first embodiment.

<Local Lists 140 and 144>

The local lists 140 and 144 take the same structures as those in the first embodiment, however, as the data to be held, these local lists retain records in which the multicast addresses are set in the virtual I\S address fields. This type of record is used when translating the virtual multicast address into the real multicast address.

<Global List 141>

The global list 141 has, in addition to the structure in the first embodiment, an addition of a virtual multicast field. With this structure, the global list 141 retains, in addition to the information retained in the first embodiment, information about the multicast packets transmitted by the terminals within the self local network. For instance, [voMulti1.g1], [voMulti2.g1] set in a DA-DNS field of the global list 141 shown in FIG. 9 are pieces of information for the multicast.

<DNS Processing Unit 133>

The DNS processing unit 133, in the same way as in the first embodiment, when queried about a DNS name from the terminal and if this DNS name is of the multicast, sends back a multicast address associated with this DNS name. According to the example in FIG. 9, when queried about the DNS name [voMulti1.g1] from the terminal, a multicast address [231.10.10.1] associated with this DNS name is sent back.

<Routing Table 142>

The routing table 142 retains, as illustrated in FIG. 11, in addition to the information held in the first embodiment, information about routing the multicast packet. An example in FIG. 11 is that a record containing [230.0.10.1] and [230.0.10.2] set in the destination address field is the information about the multicast packet.

Operational Example

Figure 12:
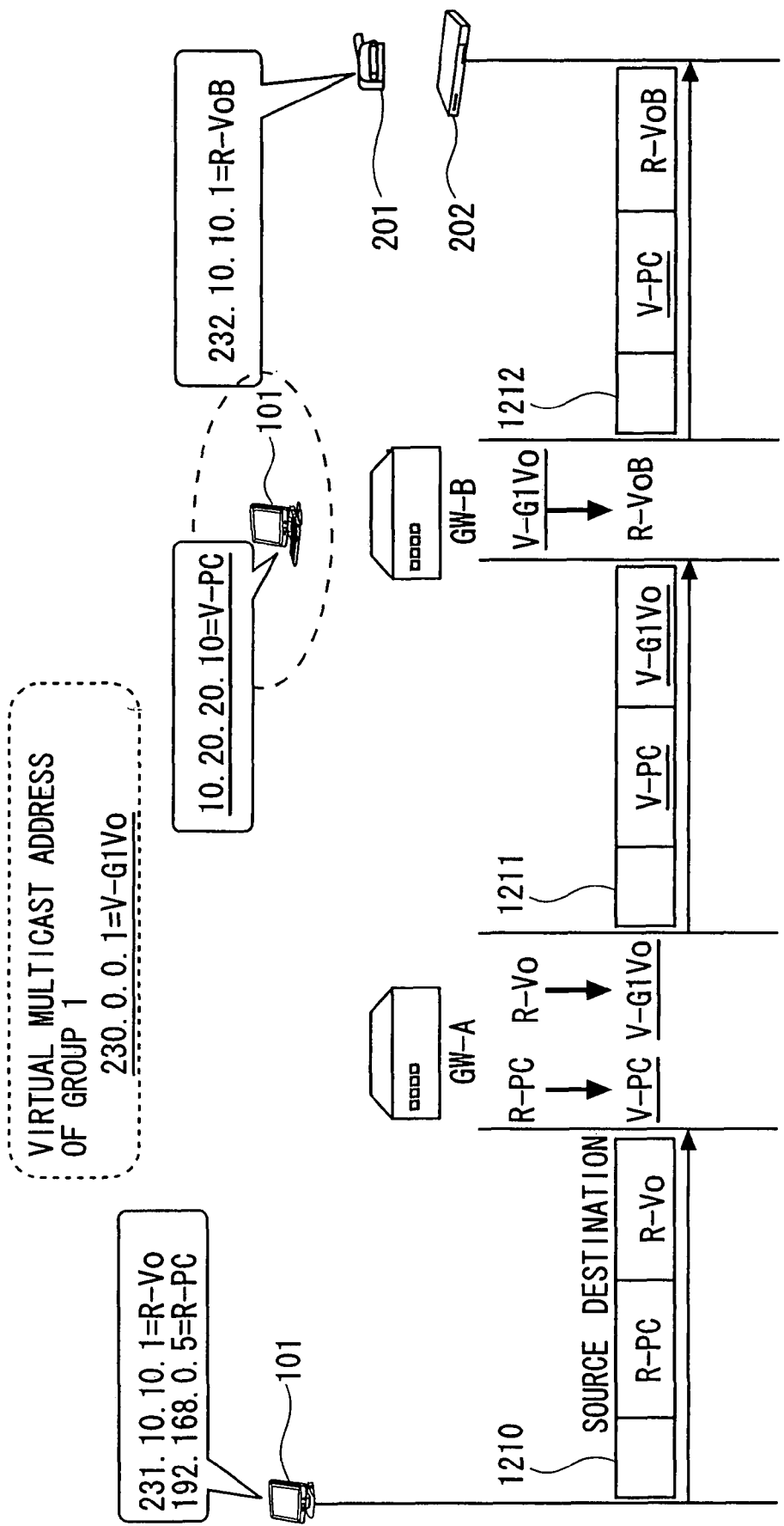
FIG. 12 is a diagram showing how the packet is forwarded in the second embodiment.
Figure 13:
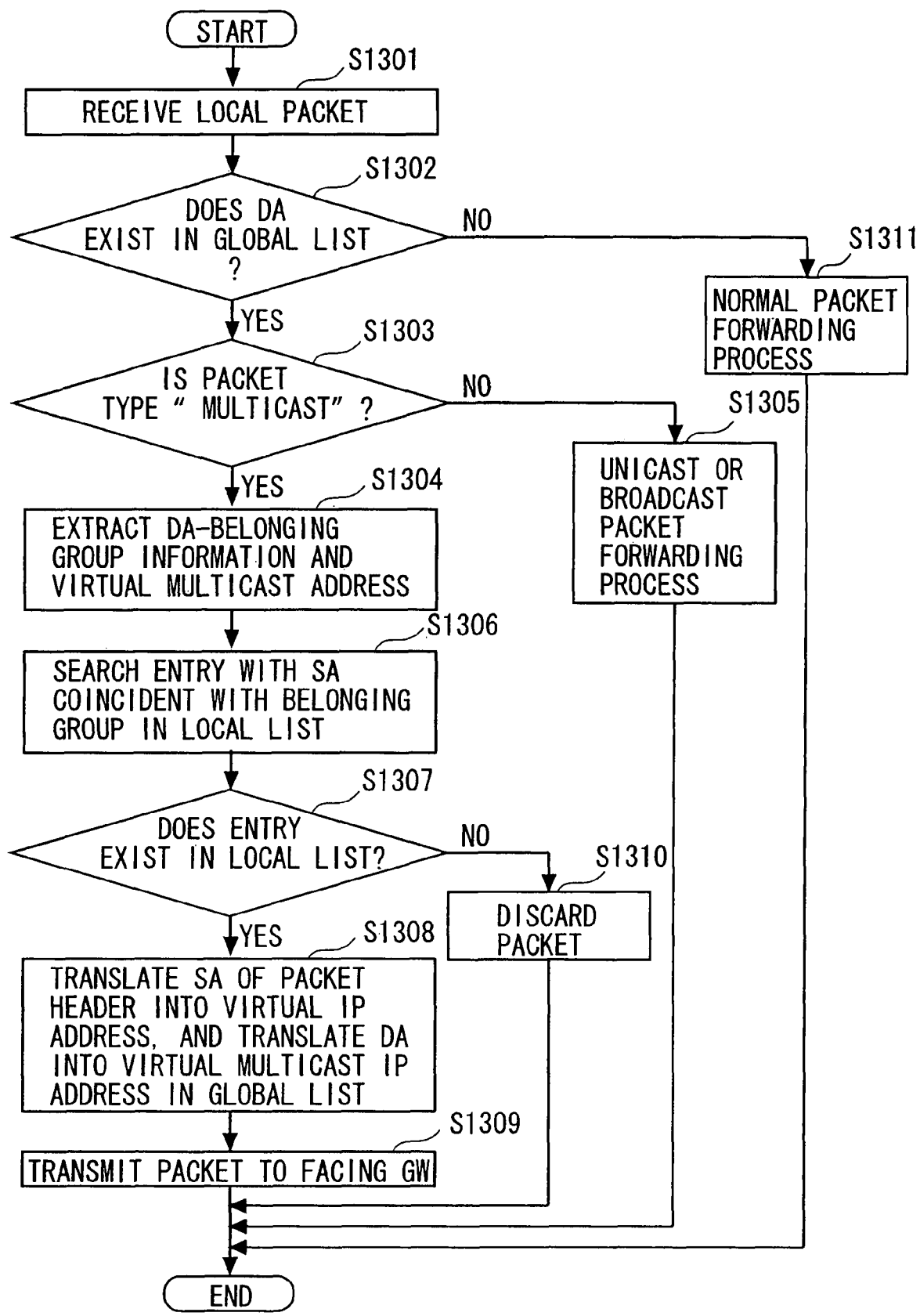
FIG. 13 is a diagram showing a packet processing flow (Local→Global) in the second embodiment.
Figure 14:
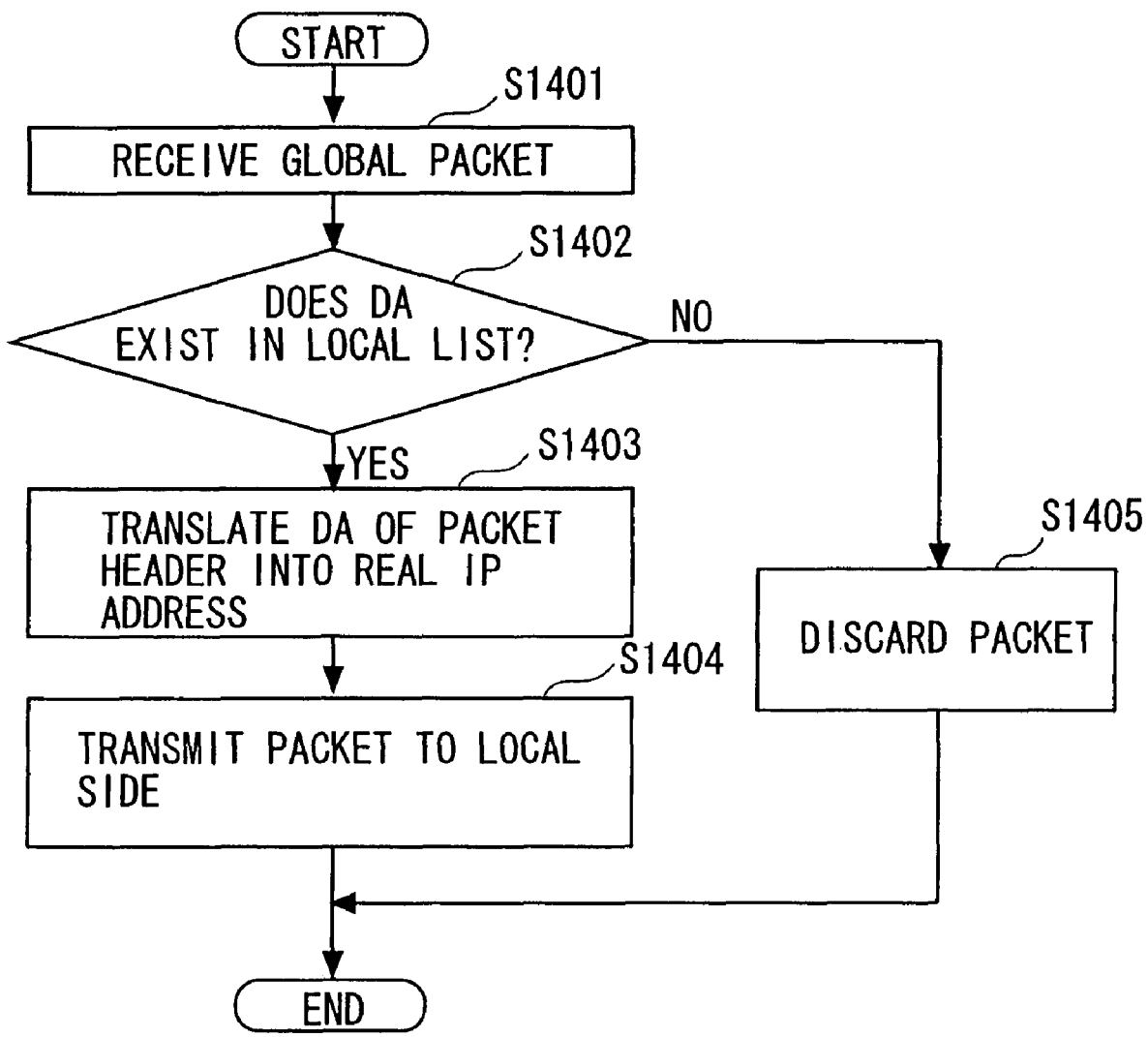
FIG. 14 is a diagram showing a packet processing flow (Global→Local) in the second embodiment.

Next, an operational example of the gateway in the second embodiment will be described with reference to FIGS. 12-14. Herein, as to the operation of the present gateway, the forwarding operation on the occasion of receiving the multicast packet from the terminal in the local network managed by the self-gateway will be outlined, and thereafter a detailed operation flow will be described. Note that the operation in the case of transmitting and receiving the data between the gateways is the same as in the first embodiment, and hence its explanation is omitted.

<Forwarding of Multicast Packet>

An outline of the operation of the present gateway when forwarding the multicast packet will be described with reference to FIG. 12. FIG. 12 is a diagram showing how the packet is forwarded when the gateway GW-A receives the multicast packet from the terminal 101 in the local network A.

The gateway GW-A, when receiving a multicast packet 1210 (having a destination address [231.10.10.1] and a source address [192.168.0.5]) transmitted by the terminal 101 (having a real IP address [192.168.0.5]), extracts the destination address [231.10.10.1] and the source address [192.168.0.5] of this packet.

The gateway GW-A determines, based on the extracted destination address and source address, whether or not the packet should be forwarded to the facing gateway (toward the core network 10). The gateway GW-A, when determining that the packet should be forwarded, translates the destination address and the source address of the packet into virtual IP addresses. The translated virtual IP addresses are addresses associated with the forwarding destination group of this packet. An example in FIG. 12 is such that the multicast address [231.10.10.1] is translated into the virtual multicast address [230.0.10.1]. Further, the source address [192.168.0.5] is translated into the virtual IP address [10.20.20.10] specifying the terminal 101 in the target group. The thus-address-translated packet is forwarded via the IP tunnel to the gateway GW-B.

The gateway GW-B, when receiving the packet 1211 forwarded from the gateway GW-A, extracts the destination address [230.0.10.1] and the source address [10.20.20.10] from the packet. The gateway GW-B determines, based on the extracted destination address and source address, whether or not the packet should be forwarded to within the local network B. The gateway GW-B, when determining that the packet should be forwarded, translates the destination address of this packet into the real multicast address [232.10.10.1] associated with the local network B from the virtual multicast address. The thus-address-translated packet 1212 is transmitted to the local network B and is received by the terminal group (the terminals 201 and 202) associated with the post-translation multicast address.

<Operation Flow>

An operation of each of the function units of the present gateway for realizing the multicast packet forwarding function described above, will be explained following the example of the packet forwarding illustrated in FIG. 12.

At the outset, the operation of each of the function units in the case of forwarding the multicast packet to the core network from the local network, will be explained with reference to FIG. 13. FIG. 13 is a flowchart showing a packet processing flow by the present gateway in the case of forwarding the multicast packet to the core network from the local network.

The NAT processing unit 136 of the gateway GW-A receives the multicast packet (containing the destination address [231.10.10.1] and the source address [192.168.0.5]) from the terminal 101 in the local network A (S1301). The NAT processing unit 136 extracts the destination address [231.10.10.1] and the source address [192.168.0.5] from this packet. Next, the NAT processing unit 136 searches for a record having the acquired destination address (multicast address) [231.10.10.1] set in the LOCAL-DA (destination designated address) field of the global list 141 (S1302). As a result, if the global list 141 contains this record (S1302;YES), the NAT processing unit 136 acquires a packet type set in a packet type field of the record. If this packet type indicates the multicast (S1303;YES), the NAT processing unit 136 extracts the information [G1] set in the belonging group field and the information [230.0.10.1] set in the virtual multicast address field of the record (S1304). In this case, [G1] is extracted as the information set in the belonging group field, and hence the NAT processing unit 136 recognizes that the multicast packet should be forwarded to the group 1 (G1). Note that the NAT processing unit 136, if no relevant record exists as a result of searching the global list 141. (S1302; NO), executes the normal packet forwarding process (S1311). The normal packet forwarding connotes the packet forwarding that does not entail grouping according to the present invention. Further, if the packet type in the record is the unicast or the broadcast (S1303; NO), the NAT processing unit 136 executes the forwarding process corresponding to each packet type (S1305). For example, in the case of the broadcast, the broadcast forwarding process explained in the first embodiment is executed.

Next, the NAT processing unit 136 searches for a record containing the acquired source address [192.168.0.5] set in the real IP address field and the belonging group information [G1] set in the belonging group field of the local list 140 (S1306). As a result, if this record exists in the local list 140 (S1307; YES), the NAT processing unit 136 determines that the multicast packet should be forwarded, and extracts the virtual IP address specifying the terminal 101 from the record. In this example, there is extracted one record containing [192.168.0.5] set in the real IP address field and [G1] set in the belonging group field of the local list 140, and the virtual IP address [10.20.20.10] in the group 1 (G1) of the terminal 101 is extracted.

Note that the NAT processing unit 136, if no relevant record exists as a result of searching the local list 140 (S1307; NO), determines that the terminal as the packet sender does not belong to the transmissible group, and discards the multicast packet (S1310).

For forwarding the multicast packet to the acquired group 1, the NAT processing unit 136 translates the destination address of this packet into the virtual multicast address [230.0.10.1] extracted from the global list 141 and the source address into [10.20.20.10] (S1308). The NAT processing unit 136 transfers the address-translated packet to the routing processing unit 137.

The routing processing unit 137 extracts the destination address from the transferred packet. Herein, [230.0.10.1] is acquired as the destination address. The routing processing unit 137 searches the routing table 142 illustrated in FIG. 11 for a record containing [LOCAL] set in the input port field and [230.0.10.1] set in the destination address field. The routing processing unit 137 transfers the facing gateway information (the gateway GW-B) set in the output port field of the searched record and the packet to the tunnel processing unit 134.

The tunnel processing unit 134, for transmitting the packet for the group 1 via the IP tunnel generated with respect to the gateway GW-B specified by the transferred facing gateway information, processes the packet for the group 1 and transfers the packet to the packet transmitting/receiving unit 131. Hereat, the tunnel setup management unit 135 sets up the IP tunnel between the gateway GW-B and the present gateway GW-A.

The packet transmitting/receiving unit 131 transmits the transferred packet (for the group 1) toward the core network 10 (S1309).

Next, an operation of each of the function units in the case of forwarding the packet from the core network to the local network, will be described with reference to FIG. 14. FIG. 14 is a flowchart showing a packet processing flow by the present gateway when forwarding the packet received from the core network to the local network. The following discussion will proceed based on the operation when the gateway GW-B receives the packet (the virtual multicast packet (having the destination address [230.0.10.1] and the source address [10.20.20.10])) for the group 1, which is transmitted by the gateway GW-A.

The packet transmitting/receiving unit 131 of the gateway GW-B receives the virtual multicast packet (having the destination address [230.0.10.1] and the source address [10.20.20.10]) from the facing gateway GW-A (S1401). The packet transmitting/receiving unit 131, upon recognizing that this packet is a packet sent via the IP tunnel from the facing gateway GW-A, transfers the packet to the tunnel processing unit 134.

The tunnel processing unit 134 extracts a desired IP packet from within the packets forwarded via the IP tunnel, and transfers the extracted packet and the facing gateway information (the gateway GW-A) defined as the packet sender to the routing processing unit 137.

The routing processing unit 137 transfers the transferred IP packet to the NAT processing unit 136 as it is. On the other hand, the routing processing unit 137 determines whether or not the transferred IP packet should be forwarded to other facing gateways GW-C and GW-D. On the occasion of this determination, the routing processing unit 137 extracts the destination address [230.0.10.1] from the IP packet. The routing processing unit 137 searches the routing table 142 for a record containing the information [gateway GW-A] entered in the input port field and the address [230.0.10.1] entered in the destination address field. As a result of the search, if the relevant record exists, the routing processing unit 137 transfers the facing gateway information set in the output port field of this record and a copy of the IP packet to the tunnel processing unit 134. It follows that the IP packet is thereby transferred further to other gateways.

The NAT processing unit 136 receiving the IP packet from the tunnel processing unit 134 extracts the destination address [230.0.10.1] from this packet. The NAT processing unit 136 searches for a record containing the acquired destination address [230.0.10.1] set in the virtual IP address field of the local list 144 (S1402). As a result, if the relevant record exists in the local list 144 (S1402; YES), the NAT processing unit 136 determines that the packet should be forwarded, and acquires the real multicast address [232.10.10.1] set in the real IP address field of the record. Note that the NAT processing unit 136, if no relevant record exists as a result of searching the local list 144 (S1402; NO), discards the packet (S1405).

The NAT processing unit 136 translates the destination address of the packet into [232.10.10.1] (S1403). The NAT processing unit 136 forwards the address-translated packet toward the local network B (S1404).

Operation/Effect in Second Embodiment

The gateway in the second embodiment forwards the multicast packet transmitted by the terminal 101 to the terminal group of the terminals serving as the members of the group associated with the multicast address thereof.

In the present gateway, on the occasion of this forwarding, the NAT processing unit 136 executes the NAT process. The operation and the effect of the present gateway related to the NAT process are the same as those in the first embodiment.

Further, the NAT processing unit 136 of the present gateway, when receiving the multicast packet from the terminal 101, recognizes the group to which the multicast address belongs from this multicast address set in the multicast packet by referring to the global list 141 and the local list 140, and forwards the multicast packet to the terminal group belonging to this group.

This operation enables each of the terminals desiring for the transmission of the multicast packet to transmit this multicast packet to the members belonging to the group by transmitting the packet in a way that sets the multicast address associated with the group to which the multicast packet is desired to be delivered.

Furthermore, to describe the operation in other words, the NAT processing unit 136 of the present gateway, when receiving the multicast packet from the terminal, does not forward the multicast packet to the group to which this terminal does not belong. Moreover, the present gateway, when receiving the packet from the core network, refers to the local list 144 and, if the local list 144 does not contain the virtual multicast address set in the destination address field of the packet, discards the packet.

This operation enables the present gateway to realize the intra-group multicast with the high security in the closed network where the respective terminals are grouped.

Further, the gateway in the second embodiment converts the multicast packet sent from within the local network into the virtual multicast packet and forwards the packet to another gateway. The gateway-to-gateway communications involve using the IP tunnel set up between the gateways and further using the routing table 142 in each gateway.

With this operation, in the case of forwarding the multicast packet, it is possible to adopt the forwarding method corresponding to the network architecture between the gateways by changing the settings in the routing tables 142 in the respective gateways. Namely, in the case of forwarding the packet to the plurality of gateways from the single gateway, without establishing the connections such as via the IP tunnels between all other gateways from the single gateway, the packet can be forwarded eventually to all of the gateways via other gateways.

Third Embodiment

The gateway device according to a third embodiment of the present invention will hereinafter be described. The gateway devices in the first embodiment and the second embodiment discussed earlier has the respective functions for realizing the broadcast and the multicast within the network where the individual terminals are grouped. The third embodiment will exemplify the gateway device including a gateway-to-gateway synchronizing process using the local lists 140 and 144, the global list 141 and the routing table 142, which are utilized for realizing the broadcast and the multicast. The network architecture and the address format are the same as those in the first embodiment illustrated in FIG. 1.

[Configuration of Device]

The gateway device according to the third embodiment has a setup information management unit 145 (corresponding to an information transmitting unit and an information update unit according to the present invention), and other components are the same function units as those in the first embodiment and the second embodiment. The respective function units are, however, slightly different in their operations. The setup information management unit 145 and the function units performing the different operations from those in the first embodiment and the second embodiment, will hereinafter be described with reference to FIG. 15. FIG. 15 is a block diagram showing part of the functional configuration of the gateway GW-A in the third embodiment. Note that the function units, which are not illustrated in FIG. 15, are the same as in the first embodiment and the second embodiment. Further, also in the third embodiment, the gateways GW-A, GW-B, GW-C and GW-D are the same devices and each have the same function blocks. Herein, the gateway GW-A will be exemplified. Further, the following discussion will omit the descriptions of the same functions of the function units as in the first embodiment and the second embodiment.

<Packet Transmitting/Receiving Unit 131>

The packet transmitting/receiving unit 131 transmits and receives a packet for a gateway-to-gateway synchronizing process. The packet transmitting/receiving unit 131, when receiving the packet for the gateway-to-gateway synchronizing process from another gateway, transfers the packet to the tunnel processing unit 134. Further, the packet transmitting/receiving unit 131, when receiving the packet for the gateway-to-gateway synchronizing process from the tunnel processing unit 134, forwards the packet to another gateway.

<Tunnel Processing Unit 134>

The tunnel processing unit 134, for transmitting various items of information notified by the setup information management unit 145 to another destination gateway via the IP tunnel, processes the IP packet (such as attaching a header). The processed IP packet is transferred to the packet transmitting/receiving unit 131 and is transmitted therefrom. Moreover, the tunnel processing unit 134 extracts a desired IP packet from within the packets for the gateway-to-gateway synchronizing process that are transmitted from other gateways, and transfers the extracted IP packet to the setup information management unit 145.

<Setup Information Management Unit 145>

The setup information management unit 145 is a function unit that updates, based on the data, for the gateway-to-gateway synchronizing process, of which the tunnel processing unit 134 has notified, the data retained in the group member list (Local→Global) management unit 132 and in the group member list (Global→Local) management unit 143. Further, the setup information management unit 145 refers to the data retained in the group member list (Local→Global) management unit 132 and in the group member list (Global→Local) management unit 143, and newly determines a virtual IP address, so as not to be overlapped with the already-used IP addresses, of a terminal in another local network that desires to newly participate in the group. Moreover, the setup information management unit 145, when a group participation request is sent by the new gateway, in order to transmit information on the terminal group related to this group back to the gateway, packetizes the information about these terminals and transfers the packetized information to the tunnel processing unit 134.

To give an example, when the terminal within the local network C managed by the gateway GW-C makes a request for participating in the group 1, the setup information management unit 145 determines the virtual IP address of the terminal for the group 1, and registers the determined address in the self global list 141. The determined virtual IP address is sent to other gateways GW-A and GW-C. Further, the setup information management unit 145, for notifying the gateway GW-C of the information on the terminal group of the terminals as the members of the group 1, refers to the global list 141 and generates a packet for transmitting these items of information. Moreover, the setup information management unit 145, in the case of giving a group registration request about the terminals within the local network managed by the self-gateway to other gateways, updates the self local lists 140 and 144 on the basis of the virtual address information of the terminals, which are sent from other gateways.

Operational Example

Next, an operational example of the gateway in the third embodiment will be described with reference to FIG. 16. FIG. 16 is a diagram showing a gateway-to-gateway synchronizing sequence in the third embodiment. Explained herein is, in a state of configuring the virtual network for the group 1 between the gateway GW-A and the gateway GW-B as illustrated in FIG. 2, an example where the terminal (e.g., a PDA) in the local network C managed by the gateway GW-C participates in the group 1.

In the state of configuring the virtual network for the group 1 between the gateway GW-A and the gateway GW-B, as stated earlier, the IP tunnel is generated between the gateway GW-A and the gateway GW-B (S1601).

In this state, at first, the gateway GW-C generates the IP tunnel with the gateway GW-B in order to participate in the group 1 (S1602). On the occasion of generating this IP tunnel, the gateway GW-C and the gateway GW-B mutually conduct gateway-to-gateway authentication and so on.

When the IP tunnel is generated, the gateway GW-C sends a request for a list of hosts (terminals) (S1603). The gateway GW-B receiving this request refers to the local list 140 and the global list 141, and sends the information about the terminals within the local network B managed by the self-gateway and the information about the terminal groups in other networks back to the gateway GW-C (S1604). The gateway GW-C receiving the information about the plurality of terminals updates the self global list 141 on the basis of these items of information.

Next, the gateway GW-C transmits the group registration request concerning the terminal desired to participate in the group 1 to the gateway GW-B (S1605). In this transmission, the gateway GW-C may transmit the group registration request in a way that contains the DNS name of the terminal.

The gateway GW-B, upon receiving the group registration request from the gateway GW-C, takes synchronization in terms of the information about the newly-participating terminal between the gateway GW-A and the gateway GW-C (S1606). For the synchronization between the gateways, the gateway GW-B may, for instance, determine the virtual IP address of the newly-participating terminal as the terminal in the group 1 so as not to overlap with the already-used virtual IP address. In this case, the gateway GW-B sends the determined virtual IP address to the gateway GW-A and the gateway GW-C. The group information on and the virtual IP address of the newly-participating terminal are thereby registered in the global lists 141 of the gateway GW-B and of the gateway GW-A. Further, the gateway GW-C updates the local lists 140 and 144 with these items of information.

Next, the synchronization in terms of the information about the virtual multicast communications and the information about the virtual broadcast communications, is taken among the gateway GW-A, the gateway GW-B and the gateway GW-C (S1607). Namely, the gateways transmit and receive the information such as the virtual multicast address for the broadcast of the broadcast packet explained in the first embodiment and the virtual multicast address of the multicast packet explained in the second embodiment, thereby taking the synchronization of the information therebetween. Another available scheme in this synchronizing process is that, e.g., the gateway GW-B determines the virtual multicast address for the broadcast and the virtual multicast address for the multicast, which are employed newly for the communications with the gateway GW-C, and notify the gateway GW-C and the gateway GW-A of these addresses.

Finally, the synchronization in terms of the information about the respective routing tables 142 is taken between the gateways (S1608). This synchronization entails the routing table setup process based on the multicast routing protocol targeted at the IP tunnel used for the gateway-to-gateway communications described in the first embodiment and the second embodiment.

Operation/Effect in Third Embodiment

The gateway in the third embodiment transmits and receives, when receiving the group registration request of the terminal in the local network managed by the self-gateway from another gateway, the address information etc about the terminal group of the terminals as the members of the target group to and from another gateway.

With this scheme, the gateways according to the present invention automatically take the synchronization of the address information etc of the terminal group in the network where the plurality of terminals exists, and hence none of the time-consuming operation such as the address management occurs. By extension, it is possible to eliminate a setting mistake such as the overlapped setting of the address by automatically conducting the address management and by automatically assigning the addresses so as not to cause any overlap. Accordingly, the network can be efficiently administered.

What is claimed is:

1. A packet relay device located at a border between a local network and a global network in a network where a plurality of local networks is connected to each other via the global network and programmed to operate in accordance with a stored program, the packet relay device comprising:
   a receiving unit to receive a broadcast packet from a terminal connected to the local network;
   an acquisition unit to specify a sender terminal from the broadcast packet and to acquire group information about a group to which the specified sender terminal belongs;
   a converting unit to convert the broadcast packet into a virtual multicast packet associated with the acquired group information; and
   a forwarding unit to forward the virtual multicast packet toward another relay device connected via the global network and associated with the virtual multicast packet, and not to forward the virtual multicast packet toward the another relay device if the acquisition unit determines that the sender terminal of the broadcast packet does not belong to any group.

2. The packet relay device according to claim 1, further comprising:
   a virtual packet receiving unit to receive the virtual multicast packet;
   a packet converting unit to convert the virtual multicast packet into a real broadcast packet associated with the virtual multicast packet; and
   a transmitting unit to transmit the real broadcast packet to within the local network.

3. The packet relay device according to claim 1, wherein the virtual multicast packet is assigned a multicast address as a destination address enabling the another packet relay device located at the border between another local network to which to connect another terminal belonging to the same group as the group to which the specified sender terminal belongs and the global network, to recognize that the virtual multicast packet is a packet into which the broadcast packet for the group has been converted.

4. A packet relay device located at a border between a local network and a global network in a network where a plurality of local networks is connected to each other via the global network and programmed to operate in accordance with a stored program, the packet relay device comprising:
   a receiving unit to receive a broadcast packet from a terminal connected to the local network;
   an acquisition unit to specify a sender terminal from the broadcast packet and to acquire group information about a group to which the specified sender terminal belongs;
   a converting unit to convert the broadcast packet into a virtual multicast packet associated with the acquired group information;
   a forwarding unit to forward the virtual multicast packet toward another relay device connected via the global network and associated with the virtual multicast packet;
   a virtual packet receiving unit to receive the virtual multicast packet;
   a virtual address extracting unit to extract the virtual multicast address from the received virtual multicast packet;
   a virtual address acquisition unit to acquire the real broadcast address associated with the extracted virtual multicast address;
   a packet converting unit to convert the received virtual multicast packet into a real broadcast packet associated with the received virtual multicast packet by using the acquired real broadcast address; and
   a transmitting unit to transmit the real broadcast packet to within the local network, and not to transmit the real broadcast packet to within the local network if the virtual address acquisition unit does not acquire the real broadcast address.

5. A packet relay device located at a border between a local network and a global network in a network where a plurality of local networks is connected to each other via the global network and programmed to operate in accordance with a stored program, the packet relay device comprising:
   a receiving unit to receive a multicast packet from a terminal connected to the local network;
   a packet group acquisition unit to acquire group information associated with the multicast packet;
   an acquisition unit to specify a sender terminal from the multicast packet, and to acquire group information about a group to which the specified sender terminal belongs;
   a group determining unit to determine a destination group from the group information acquired by the packet group acquisition unit and from the group information acquired by the acquisition unit;
   a converting unit to convert the received multicast packet into a virtual multicast packet associated with the destination group; and
   a forwarding unit to forward the virtual multicast packet toward another relay device connected via the global network and associated with the virtual multicast packet, and not to forward the virtual multicast packet toward the another relay device if the group determining unit determines, from the group information acquired by the packet group acquisition unit and from the group information acquired by the acquisition unit, that any coincident group does not exist.

6. The packet relay device according to claim 5, further comprising:
   a virtual packet receiving unit to receive the virtual multicast packet;
   a packet converting unit to convert the virtual multicast packet into a real multicast packet associated with the virtual multicast packet; and
   a transmitting unit to transmit the real multicast packet to within the local network.

7. The packet relay device according to claim 5, wherein the virtual multicast packet is assigned a multicast address as a destination address enabling the another packet relay device located at the border between another local network to which to connect another terminal belonging to the same group as the group associated with the pre-conversion multicast packet and the global network, to recognize that the virtual multicast packet is a packet into which the multicast packet for the group has been converted.

8. A packet relay device located at a border between a local network and a global network in a network where a plurality of local networks is connected to each other via the global network and programmed to operate in accordance with a stored program, the packet relay device comprising:
   a receiving unit to receive a multicast packet from a terminal connected to the local network;
   a packet group acquisition unit to acquire group information associated with the multicast packet;

an acquisition unit to specify a sender terminal from the multicast packet, and to acquire group information about a group to which the specified sender terminal belongs;

a group determining unit to determine a destination group from the group information acquired by the packet group acquisition unit and from the group information acquired by the acquisition unit;

a converting unit to convert the received multicast packet into a virtual multicast packet associated with the destination group;

a forwarding unit to forward the virtual multicast packet toward another relay device connected via the global network and associated with the virtual multicast packet;

a virtual packet receiving unit to receive the virtual multicast packet;

a virtual address extracting unit to extract the virtual multicast address from the received virtual multicast packet;

a virtual address acquisition unit to acquire the real multicast address associated with the extracted virtual multicast address, and a packet converting unit to convert the received virtual multicast packet into a real multicast packet associated with the received virtual multicast packet by using the acquired real multicast address; and a transmitting unit to transmit the real multicast packet to within the local network, and not to transmit the real multicast packet to within the local network if the virtual address acquisition unit does not acquire the real multicast address.

9. A packet relay device located at a border between a local network and a global network in a network where a plurality of local networks is connected to each other via the global network and programmed to operate in accordance with a stored program, the packet relay device comprising:

a receiving unit to receive a broadcast packet from a terminal connected to the local network;

an acquisition unit to specify a sender terminal from the broadcast packet and to acquire group information about a group to which the specified sender terminal belongs;

a converting unit to convert the broadcast packet into a virtual multicast packet associated with the acquired group information;

a forwarding unit to forward the virtual multicast packet toward another relay device connected via the global network and associated with the virtual multicast packet;

an information transmitting unit to transmit, to the another packet relay device, information about the terminal connected to the local network to which the self packet relay device is connected, group information about the group to which the terminal belongs, converting information for converting the broadcast packet transmitted from the terminal into a virtual multicast packet associated with the group, and reverse converting information for converting the virtual multicast packet into the real broadcast packet; and an information updating unit to update the self-retained group information, the self-retained converting information and the self-retained reverse converting information on the basis of the group information, the converting information and the reverse converting information given from the another packet relay device.

10. A packet relay device located at a border between a local network and a global network in a network where a plurality of local networks is connected to each other via the global network and programmed to operate in accordance with a stored program, the packet relay device comprising:

a receiving unit to receive a multicast packet from a terminal connected to the local network;

a packet group acquisition unit to acquire group information associated with the multicast packet;

an acquisition unit to specify a sender terminal from the multicast packet, and to acquire group information about a group to which the specified sender terminal belongs;

a group determining unit to determine a destination group from the group information acquired by the packet group acquisition unit and from the group information acquired by the acquisition unit;

a converting unit to convert the received multicast packet into a virtual multicast packet associated with the destination group;

a forwarding unit to forward the virtual multicast packet toward another relay device connected via the global network and associated with the virtual multicast packet;

an information transmitting unit to transmit, to the another packet relay device, group information associated with the multicast packet transmitted from the terminal connected to the local network, second group information about a group to which the terminal belongs, converting information for converting the multicast packet into a virtual multicast packet associated with the destination group, and reverse converting information for converting the virtual multicast packet into the real multicast packet; and an information updating unit to update the self-retained group information, the self-retained second group information, the self-retained converting information and the self-retained reverse converting information on the basis of the group information, the second group information, the converting information and the reverse converting information given from the another packet relay device.

11. A packet relay method executed by a packet relay device located at a border between a local network and a global network in a network where a plurality of local networks is connected to each other via the global network, the packet relay method comprising:

receiving a broadcast packet from a terminal connected to the local network;

specifying a sender terminal from the broadcast packet and acquiring group information about a group to which the specified sender terminal belongs;

converting the broadcast packet into a virtual multicast packet associated with the acquired group information; and forwarding the virtual multicast packet toward another relay device connected via the global network and associated with the virtual multicast packet, and not forwarding the virtual multicast packet toward the another relay device if the specifying specifies that the sender terminal of the broadcast packet does not belong to any group.

12. The packet relay method according to claim 11, further comprising:

receiving the virtual multicast packet;

converting the virtual multicast packet into a real broadcast packet associated with the virtual multicast packet; and transmitting the real broadcast packet to within the local network.

13. A packet relay method executed by a packet relay device located at a border between a local network and a global network in a network where a plurality of local networks is connected to each other via the global network, the packet relay method comprising:

receiving a multicast packet from a terminal connected to the local network;

acquiring group information associated with the multicast packet;

specifying a sender terminal from the multicast packet, and acquiring second group information about a group to which the specified sender terminal belongs;

determining a destination group from the group information and from the second group information;

converting the received multicast packet into a virtual multicast packet associated with the destination group; and forwarding the virtual multicast packet toward another relay device connected via the global network and associated with the virtual multicast packet, and not forwarding the virtual multicast packet toward the another relay device if the determining determines, from the group information acquired by the packet group acquisition unit and from the group information acquired by the acquisition unit, that any coincident group does not exist.

14. The packet relay method according to claim 13, further comprising:

receiving the virtual multicast packet;

converting the virtual multicast packet into a real multicast packet associated with the virtual multicast packet; and transmitting the real multicast packet to within the local network.

* * * * *